US012513898B2

(12) United States Patent
Rha et al.

(10) Patent No.: US 12,513,898 B2
(45) Date of Patent: Dec. 30, 2025

(54) SEMICONDUCTOR DEVICE AND DATA STORAGE SYSTEM INCLUDING THE SAME

(71) Applicant: Samsung Electronics Co., Ltd., Suwon-si (KR)

(72) Inventors: Sangho Rha, Seongnam-si (KR); Iksoo Kim, Yongin-si (KR); Jiwoon Im, Hwaseong-si (KR); Byungsun Park, Suwon-si (KR); Seonkyu Shin, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 461 days.

(21) Appl. No.: 17/539,523

(22) Filed: Dec. 1, 2021

(65) Prior Publication Data

US 2022/0216227 A1    Jul. 7, 2022

(30) Foreign Application Priority Data

Jan. 5, 2021  (KR) .......................... 10-2021-0001099

(51) Int. Cl.
*H10B 41/27* (2023.01)
*G11C 5/02* (2006.01)
(Continued)

(52) U.S. Cl.
CPC ............ *H10B 41/27* (2023.02); *G11C 5/025* (2013.01); *G11C 5/06* (2013.01); *H10B 43/27* (2023.02); *H10D 64/517* (2025.01)

(58) Field of Classification Search
CPC ........ H10B 41/27; H10B 43/35; H10B 41/50; H10B 43/27; H01L 23/5286
See application file for complete search history.

(56) References Cited

U.S. PATENT DOCUMENTS 8,476,713 B2    7/2013  Lee et al.
8,652,921 B2    2/2014  Lee et al.
(Continued)

FOREIGN PATENT DOCUMENTS

CN         109496356 A      3/2019
KR    10-2011-0087870 A     8/2011
(Continued)

OTHER PUBLICATIONS

Korean Office Action dated Mar. 10, 2025 for corresponding Korean Application No. 10-2021-0001099.
(Continued)

*Primary Examiner* — Brian Turner
(74) *Attorney, Agent, or Firm* — Harness, Dickey & Pierce, P.L.C.

(57) ABSTRACT

A semiconductor device includes a memory cell structure on a substrate, and a dummy structure on a side of the memory cell structure. The memory cell structure includes a memory stack structure including interlayer insulating layers and gate electrodes alternately stacked on the substrate, channel structures penetrating through the memory stack structure and contacting the substrate, and first separation structures penetrating through the memory stack structure and extending in the first direction to separate the gate electrodes from each other in a second direction. The dummy structure includes dummy stack structures spaced apart from the memory stack structure and including first insulating layers and dummy gate electrodes alternately stacked, dummy channel structures penetrating through the dummy stack structures, and second separation structures penetrating through the dummy stack structures and extending in the second direction to separate the dummy gate electrodes from each other in the first direction.

19 Claims, 24 Drawing Sheets

(51) Int. Cl.
    *G11C 5/06*     (2006.01)
    *H10B 43/27*     (2023.01)
    *H10D 64/27*     (2025.01)

(56) References Cited

U.S. PATENT DOCUMENTS

| | | | |
|---|---|---|---|
| 9,397,043 B1* | 7/2016 | Minemura | H10B 43/10 |
| 10,276,591 B2 | 4/2019 | Lee et al. | |
| 10,622,372 B2 | 4/2020 | Hishida et al. | |
| 10,700,081 B2 | 6/2020 | Oh | |
| 2011/0121403 A1 | 5/2011 | Lee et al. | |
| 2013/0171809 A1* | 7/2013 | Lee | H10D 30/69 |
| | | | 438/492 |
| 2014/0334232 A1 | 11/2014 | Nam et al. | |
| 2016/0268287 A1* | 9/2016 | Park | H10B 43/10 |
| 2018/0247953 A1 | 8/2018 | Lee | |
| 2019/0057974 A1* | 2/2019 | Lu | H01L 21/76802 |
| 2019/0114099 A1 | 4/2019 | Jeon et al. | |
| 2019/0228824 A1* | 7/2019 | Lee | G11C 13/0026 |
| 2020/0013714 A1* | 1/2020 | Lin | H10D 84/811 |
| 2020/0051600 A1* | 2/2020 | Hwang | G11C 7/1063 |
| 2020/0058670 A1* | 2/2020 | Oh | H10B 41/35 |
| 2020/0119031 A1 | 4/2020 | Shen et al. | |

FOREIGN PATENT DOCUMENTS

| | | |
|---|---|---|
| KR | 10-2016-0109988 A | 9/2016 |
| KR | 10-2019-0041319 A | 4/2019 |
| KR | 102083506 B1 | 3/2020 |

OTHER PUBLICATIONS

Notice of Allowance issued in corresponding Korean Patent Application No. 10-2021-0001099, dated Oct. 26, 2025.

* cited by examiner

III-III'

SEMICONDUCTOR DEVICE AND DATA STORAGE SYSTEM INCLUDING THE SAME

CROSS-REFERENCE TO RELATED APPLICATION(S)

This application claims benefit of priority to Korean Patent Application No. 10-2021-0001099, filed on Jan. 5, 2021 in the Korean Intellectual Property Office, the disclosure of which is incorporated herein by reference in its entirety.

BACKGROUND

The present disclosure relates to a semiconductor device and/or a data storage system including the same.

In data storage systems, semiconductor devices capable of storing high-capacity data may be required. Accordingly, a method of increasing the data storage capacity of a semiconductor device is being researched. For example, as the method of increasing the data storage capacity of a semiconductor device, a semiconductor device including memory cells arranged three-dimensionally, rather than two-dimensionally, has been proposed.

SUMMARY

Some example embodiments provide a semiconductor device having improved reliability.

Some example embodiments provide a data storage system including a semiconductor device having improved reliability.

According to an example embodiment, a semiconductor device may include a peripheral circuit region including a first substrate and circuit elements on the first substrate; and a memory cell region on the peripheral circuit region. The memory cell region may include a second substrate on the peripheral circuit region, a memory stack structure including interlayer insulating layers and gate electrodes alternately stacked on the second substrate, channel structures penetrating through the memory stack structure in a vertical direction and each including a channel layer electrically connected to the second substrate, first separation structures penetrating through the memory stack structure in the vertical direction, a dummy stack structure spaced apart from at least one side of the memory stack structure, dummy channel structures, and second separation structures. The first separation structures may extend in a first direction and may be spaced apart from each other in a second direction. The dummy stack structure may include first insulating layers stacked on each other and spaced apart from each other in the vertical direction on the second substrate, second insulating layers between the first insulating layers, and dummy gate electrodes having side surfaces in contact with side surfaces of the second insulating layers. The dummy channel structures may penetrate through the first insulating layers and the dummy gate electrodes of the dummy stack structure in the vertical direction. The dummy channel structures each may include a dummy channel layer. The second separation structures may penetrate through the first insulating layers and the dummy gate electrodes of the dummy stack structure in the vertical direction. The second separation structures may extend in the second direction and may be spaced apart from each other in the first direction. The first direction and the second direction may be parallel to an upper surface of the first substrate and may intersect each other.

According to an example embodiment, a semiconductor device may include a substrate; a memory cell structure on the substrate; and a dummy structure on at least one side of the memory cell structure on the substrate. The memory cell structure may include a memory stack structure including interlayer insulating layers and gate electrodes alternately stacked on the substrate, channel structures penetrating through the memory stack structure and contacting the substrate, and first separation structures penetrating through the memory stack structure and extending in a first direction to separate the gate electrodes from each other in a second direction. The dummy structure may include dummy stack structures spaced apart from the memory stack structure on the substrate, dummy channel structures penetrating through the dummy stack structures, and second separation structures penetrating through the dummy stack structures. The dummy stack structures may include first insulating layers and dummy gate electrodes alternately stacked. The second separation structures may extend in the second direction to separate the dummy gate electrodes from each other in the first direction.

According to an example embodiment, a data storage system may include a semiconductor storage device and a controller configured to control the semiconductor storage device. The semiconductor storage device may include a peripheral circuit region including circuit elements, a memory cell structure on the peripheral circuit region, a dummy structure on at least one side of the memory cell structure on the peripheral circuit region, and an input/output pad electrically connected to the circuit elements. The peripheral circuit region may include a first substrate. The circuit elements may be on the first substrate. The memory cell structure may include a memory stack structure including a second substrate on the peripheral circuit region, interlayer insulating layers and gate electrodes alternately stacked on the second substrate, channel structures penetrating through the memory stack structure to contact the second substrate, and first separation structures penetrating through the memory stack structure. The first separation structures may extend in a first direction to separate the gate electrodes from each other in a second direction. The dummy structure may include a dummy stack structure and second separation structures. The dummy stack structure may be spaced apart from the memory stack structure on the second substrate. The dummy stack structure may include first insulating layers and dummy gate electrodes alternately stacked, dummy channel structures penetrating through the dummy stack structures, and second separation structures penetrating through the dummy stack structure. The second separation structures may extend in the second direction to separate the dummy gate electrodes from each other in the first direction. The controller may be electrically connected to the semiconductor storage device through the input/output pad.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

When the term "substantially" is used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified by "substantially," it will be understood that these values and shapes should be construed as including a manufacturing or operational tolerance (e.g., ±10%) around the stated numerical values or shapes.

Expressions such as "at least one of," when preceding a list of elements (e.g., A, B, and C), modify the entire list of elements and do not modify the individual elements of the list. For example, "at least one of A, B, and C," "at least one of A, B, or C," "one of A, B, C, or a combination thereof," and "one of A, B, C, and a combination thereof," respectively, may be construed as covering any one of the following combinations: A; B; A and B; A and C; B and C; and A, B, and C."

Hereinafter, some example embodiments will be described with reference to the accompanying drawings.

Figure 1:
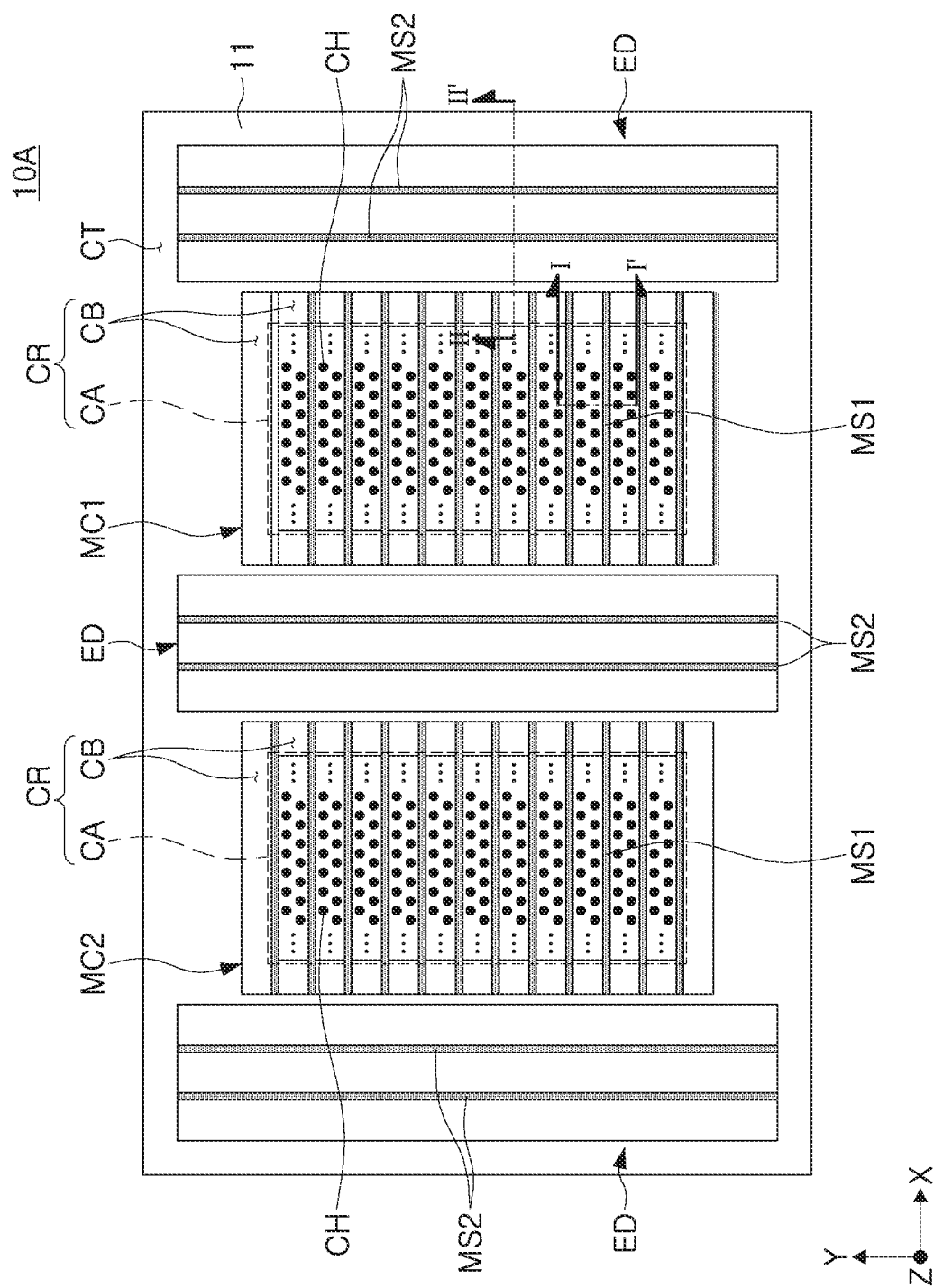
FIG. 1 is a schematic plan view of a semiconductor device according to some example embodiments.

FIG. 1 is a schematic plan view of a semiconductor device according to some example embodiments.

Figure 2A:
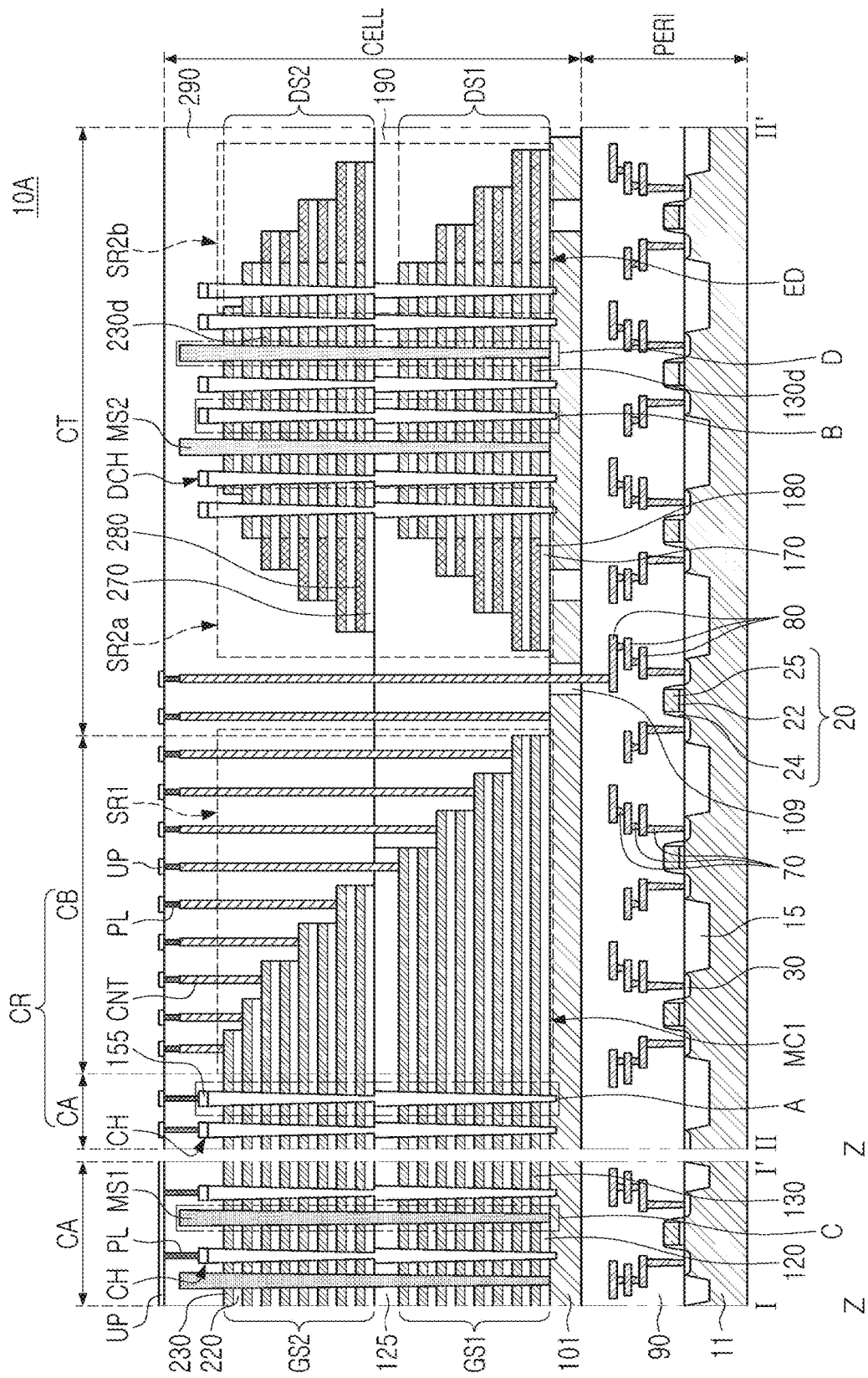
FIGS. 2A to 2C are schematic cross-sectional views of semiconductor devices according to some example embodiments.

FIG. 2A is a schematic cross-sectional view of semiconductor devices according to some example embodiments. FIG. 2A illustrates cross-sections taken along lines I-I' and II-II' of FIG. 1.

Referring to FIGS. 1 and 2A, a semiconductor device 10A may include a memory cell region CELL and a peripheral circuit region PERI. The memory cell region CELL may be disposed on the peripheral circuit region CELL. Conversely, in an example embodiment, the memory cell region CELL may be disposed below the peripheral circuit region PERI.

The peripheral circuit region PERI may include a first substrate 11, circuit elements 20 disposed on the first substrate 11, circuit contact plugs 70, and circuit interconnection lines 80.

The first substrate 11 may include a semiconductor material such as a group IV semiconductor, a group III-V compound semiconductor, or a group II-VI compound semiconductor. The first substrate 11 may include an edge region formed during a process of separating a plurality of semiconductor devices on a semiconductor wafer. In an example embodiment, a moisture oxidation barrier structure and/or a crack-stop structure may be disposed on a region adjacent to the edge region. The first substrate 11 may have an upper surface extending in X and Y directions. The X and Y directions may be parallel to an upper surface of the first substrate 11 and may intersect each other. In the first substrate 11, device isolation layers 15 may be formed to define an active region, as illustrated in FIG. 2A. Source/drain regions 30, including impurities, may be disposed in a portion of the active region.

The circuit elements 20 may include transistors. Each of the transistors of the circuit elements 20 may include a circuit gate dielectric layer 22, a spacer layer 24, and a circuit gate electrode 25. Source/drain regions 30 may be disposed in the first substrate 11 on opposite sides adjacent to the circuit gate electrode 25. The spacer layer 24 may be disposed on a side surface of the circuit gate electrode 25.

A peripheral region insulating layer 90 may be disposed on the first substrate 11 and the circuit elements 20. Circuit contact plugs 70 may penetrate through a portion of the peripheral insulating layer 90 to be connected to the circuit elements 20 or source/drain regions 30. An electrical signal may be applied to the circuit element 20 or the source/drain regions 30 by the circuit contact plugs 70. The circuit interconnection lines 80 may be connected to the circuit contact plugs 70 and may be disposed as a plurality of layers.

The memory cell region CELL may include second substrate 101, memory cell structures MC1 and MC2, and a dummy structure ED. The dummy structure ED may be disposed to be spaced apart from the memory cell structures MC1 and MC2 on at least one side of the memory cell structures MC1 and MC2. The memory cell region CELL may further include a substrate insulating layer 109, capping insulating layers 190 and 290, an upper contact plug PL, a contact plug CNT, and upper interconnections UP.

The second substrate 101 may be disposed on the peripheral circuit region PERI. The second substrate 101 may have a cell region CR and a peripheral region CT. The cell region CR may include a cell array region CA, in which channel structures CH are disposed to provide memory cells, and a cell staircase region CB for connecting gate electrodes 130 and 230 of the memory cells to the upper interconnections UP. On the cell staircase region CB, the gate electrodes 130 and 230 of the memory cells may extend while having a staircase shape. The cell staircase region CB may be disposed on at least one end of the cell array region CA in at least one direction, for example, in the X direction, or may be disposed along an edge of the cell array region CA.

The second substrate 101 may include a silicon layer. The second substrate 101 may further include impurities. For example, the second substrate 101 may include an N-type silicon layer. The second substrate 101 may include an N-type polycrystalline silicon layer. In some example embodiments, the second substrate 101 may have a thickness greater than a thickness of the first substrate 11, but example embodiments are not limited thereto. The substrate insulating layer 109 may be disposed to penetrate through a portion of the second substrate 101.

The memory cell structures MC1 and MC2 may include a first memory cell structure MC1 and a second memory cell structure MC2 spaced apart from each other and disposed to be side by side with each other on the second substrate 101. However, the number and disposition form of the memory cell structures MC1 and MC2 may vary in some example embodiments. Hereinafter, one memory cell structure MC1 will be described.

The memory cell structure MC1 may include memory stack structures GS1 and GS2, channel structures CH, and first separation structures MS1. The memory stack structures GS1 and GS2 may include a first stack structure GS1 on the second substrate 101 and a second stack structure GS2 on the first stack structure GS1.

The first stack structure GS1 may include first interlayer insulating layers 120 and first gate electrodes 130 alternately stacked on the second substrate 101. The second stack structure GS2 may include second interlayer insulating layers 220 and second gate electrodes 230 alternately stacked on the first stack structure GS1. The first gate electrodes 130 of the first stack structure GS1 may constitute a first gate group, and the second gate electrodes 230 of the second stack structure GS2 may constitute a second gate group.

The gate electrodes 130 and 230 may be disposed to be vertically spaced apart on the second substrate 101. The number of gate electrodes 130 and 230, constituting memory cells, may be determined depending on data storage capacity of the semiconductor device 10A.

The gate electrodes 130 and 230 may extend from the cell array region CA to the cell staircase region CB by different lengths in the Y direction to constitute a first staircase structure SR1 having a staircase shape. End portions of the gate electrodes 130 and 230 may be lowered in the Y direction by the first staircase structure SR1 to form a staircase shape, in which an underlying gate electrode is extended to be longer than an overlying gate electrode, and to provide a pad region exposed upwardly from the interlayer insulating layers 120 and 220. As illustrated in FIG. 1, the cell staircase region CB, in which the first staircase structure SR1 is provided, may be disposed on both sides of the cell array region CA in the X direction. A certain number of gate electrodes 130 and 230, for example, two, four, or six gate electrodes, may constitute a group to form a staircase structure between the groups in the X direction. The staircase structure of the gate electrodes 130 and 230 may vary in some example embodiments.

The gate electrodes 130 and 230 may be disposed to be separated by desired (and/or alternatively predetermined) units by the first separation structure MS1. For example, the gate electrodes 130 and 230 may be separated in the Y direction by a pair of first separation structures MS1, adjacent to each other and extending in the X direction, to extend in the X direction, respectively. The gate electrodes 130 and 230 may constitute a single memory block between the pair of first separation structures MS1 adjacent to each other, but a range of the memory block is not limited thereto.

The gate electrodes 130 and 230 may include a metal material such as at least one of tungsten (W), titanium (Ti), tantalum (Ta), aluminum (Al), molybdenum (Mo), and ruthenium (Ru). According to embodiments, the gate electrodes 130 and 230 may include polycrystalline silicon or a metal silicide material. In some example embodiments, the gate electrodes 130 and 230 may further include a diffusion barrier. For example, the diffusion barrier may include a metal nitride, for example, a tungsten nitride (WN), a tantalum nitride (TaN), a titanium nitride (TiN), or combinations thereof.

Each of the interlayer insulating layers 120 and 220 may be disposed between the gate electrodes 130 and 230. Similarly to the gate electrodes 130 and 230, the interlayer insulating layers 120 and 220 may be spaced apart from each other in a direction, perpendicular to the upper surface of the second substrate 101, and may be disposed to extend in at least one direction. In addition, the interlayer insulating layers 120 and 220 may constitute a first staircase structure SR1 on the cell staircase region CB together with the gate electrodes 130 and 230. Similarly to the gate electrodes 130 and 230, the interlayer insulating layers 120 and 220 may be separated in the Y direction by a pair of first separation structures MS1, adjacent to each other and extending in the X direction, to extend in the X direction, respectively. The interlayer insulating layers 120 and 220 may include an insulating material such as a silicon oxide or a silicon nitride.

The channel structures CH may each form a single memory cell string, and may be spaced apart from each other while forming rows and columns on the cell array region CA of the second substrate 101. The channel structures CH may be disposed to form a grid pattern or may be disposed in a zigzag shape in one direction. The channel structures CH have a columnar shape, and may have inclined side surfaces narrowed in a direction toward the second substrate 101 according to an aspect ratio. In some example embodiments, dummy channels which do not substantially form a memory cell string may be disposed on an end portion of the cell array region CA, adjacent to the connection region CB, and on the connection region CB.

The channel structures CH may be disposed to form a grid pattern or may be disposed in a zigzag shape in one direction. The channel structures CH may have a columnar shape, and may have inclined side surfaces that become narrower as they are closer to the second substrate 101 according to an aspect ratio. In some example embodiments, dummy channels that do not substantially form a memory cell string may be disposed on an end of the cell array region CA adjacent to the cell staircase region CB and on the cell staircase region CB.

Each of the channel structures CH may be disposed to penetrate through the stack structures GS1 and GS2 in a vertical direction, for example, a Z direction to be in contact with the second substrate 101. A channel layer 140 (see FIG. 3A or 3B) of the channel structures CH may be electrically connected to the second substrate 101. Each of the channel structures CH may have a shape in which lower and upper channel structures penetrating through the first and second gate groups of the first and second gate electrodes 130 and 230 are connected to each other, and may have a bent portion (also referred to as a bent region) formed by a difference or change in widths in a connection region. The bent portion may be disposed between the first gate group of the first gate electrodes 130 and the second gate group of the second gate electrodes 230. A detailed structure of the channel structures CH will be described later in more detail with reference to FIGS. 3A and 3B.

As illustrated in FIG. 2A, the first separation structures MS1 may penetrate through the memory stack structures GS1 and GS2 in a vertical direction, for example, a Z direction. The first separation structures MS1 may separate the gate electrodes 130 and 230 of the memory stack structures GS1 and GS2 in the Y direction. As illustrated in FIG. 1, the first separation structures MS1 may extend upwardly of the cell staircase region CB from the cell array region CA in the X direction. The first separation structures MS1 may be spaced apart from each other in the Y direction and may be disposed to be side by side with each other. The first separation structures MS1 may penetrate through the gate electrodes 130 and 230 in Z direction to be in contact with the second substrate 101. The first separation structures MS1 may be disposed to recess a portion of an upper portion of the second substrate 101, or may be disposed on the second substrate 101 to be in contact with an upper surface of the second substrate 101. The first separation structures MS1 may include an insulating material, for example, a silicon oxide, a silicon nitride, or a combination thereof.

The dummy structure ED may include dummy stack structures DS1 and DS2, dummy channel structures DCH, and second separation structures MS2. The dummy stack structures DS1 and DS2 may include a first dummy stack structure DS1 on the second substrate 101 and a second dummy stack structure DS2 on the first dummy stack structure DS1. The dummy stack structures DS1 and DS2 may be introduced to reduce a process distribution when the staircase structure of the memory stack structures GS1 and GS2 is formed and to reduce a dishing phenomenon of the capping insulating layers 190 and 290 during a planarization process on the peripheral region CT. As illustrated in FIG. 1, a plurality of dummy structures ED may be disposed on opposite side regions of the memory cell structure MC1.

The first dummy stack structure DS1 may include first lower insulating layers 170 and second lower insulating layers 180 alternately stacked on the second substrate 101. The first dummy stack structure DS1 may further include first dummy gate electrodes 130d having side surfaces in contact with side surfaces of the second lower insulating layers 180 between the first lower insulating layers 170. The second dummy stack structure DS2 may include first upper insulating layers 270 and second upper insulating layers 280 alternately stacked on the first dummy stack structure DS1. The second dummy stack structure DS2 may further include second dummy gate electrodes 230d having side surfaces in contact with side surfaces of the second upper insulating layers 280 between the first upper insulating layers 270. The first dummy gate electrodes 130d of the first dummy stack structure DS1 may constitute a first dummy gate group, and the second dummy gate electrodes 230d of the second dummy stack structure DS2 may constitute a second dummy gate group.

The first dummy stack structure DS1 may have staircase-shaped steps. For example, the second lower insulating layers 180 may extend by different lengths in the X direction to form second staircase structures SR2a and SR2b. Similarly to the second lower insulating layers 180, the first lower insulating layers 170 may constitute second staircase structures SR2a and SR2b. The first and second lower insulating layers 170 and 180 may have a shape in which end portions of the dummy stack structures DS1 and DS2 are lowered in a direction toward both sides of the dummy stack structures DS1 and DS2 in the X direction by the second staircase structures SR2a and SR2b.

The second dummy stack structure DS2 may have staircase-shaped steps. For example, the second upper insulating layers 280 may extend by different lengths in the X direction to constitute second staircase structures SR2a and SR2b. Similarly to the second upper insulating layers 280, the first upper insulating layers 270 may constitute second staircase structures SR2a and SR2b having staircase shapes.

The second staircase structures SR2a and SR2b may be disposed on both sides of the dummy stack structures DS1 and DS2 in the X direction, as illustrated in FIG. 2A. In an example embodiment, a staircase structure may be formed on both sides of the dummy stack structures DS1 and DS2 in the Y direction. A portion SR2a of the second staircase structures SR2a and SR2b may be disposed to face the first staircase structure SR1 on the cell staircase region CB in the X direction, and the other portion SR2b may be disposed to face the edge region of the semiconductor device 10A. In an example embodiment, each of the second staircase structure SR2a and SR2b may have a shape different from a shape of the first staircase structure SR1. In an example embodiment, at least a portion of the dummy gate electrodes 130d and 230d may constitute a portion of the second staircase structures SR2a and SR2b.

The first lower insulating layers 170 may be stacked on the second substrate 101 to be spaced apart from each other in a vertical direction, for example, the Z direction. The first lower insulating layers 170 may be disposed at a height level corresponding to a height level of the first interlayer insulating layers 120. The first lower insulating layers 170 may have substantially the same thickness as the first interlayer insulating layers 120. The first lower insulating layers 170 may include the same material as the first interlayer insulating layers 120, and may include a material different from a material of the second lower insulating layers 180.

The second lower insulating layers 180 may be stacked on the second substrate 101 to be spaced apart from each other in a vertical direction, for example, in the Z direction. The second lower insulating layers 180 may be disposed at a height level corresponding to a height level of the first gate electrodes 130. The second lower insulating layers 180 may have substantially the same thickness as the first gate electrodes 130.

The first upper insulating layers 270 may be stacked on the first dummy stack structure DS1 to be spaced apart from each other in a vertical direction, for example, the Z direction. The first upper insulating layers 270 may be disposed at a height level corresponding to a height level of the second interlayer insulating layers 220. The first upper insulating layers 270 may have substantially the same thickness as the second interlayer insulating layers 220. The first upper insulating layers 270 may include the same material as the second interlayer insulating layers 220, and may include a material different from a material of the second upper insulating layers 280.

The second upper insulating layers 280 may be stacked on the first dummy stack structure DS1 to be spaced apart from each other in a vertical direction, for example, the Z direction. The second upper insulating layers 280 may be disposed at a height level corresponding to a height level of the second gate electrodes 230. The second upper insulating layers 280 may have substantially the same thickness as the second gate electrodes 230.

In an example embodiment, the first and second interlayer insulating layers 120 and 220 and the first lower and upper insulating layers 170 and 270 include a silicon oxide, and the second lower and upper insulating layers 180 and 280 may include a silicon nitride.

The first dummy gate electrodes 130d may be layers in which a portion of the second lower insulating layers 180 are replaced with a conductive material. The first dummy gate electrodes 130d are disposed at substantially the same height level as the second lower insulating layers 180, and may have substantially the same thickness as the second lower insulating layers 180.

The second dummy gate electrodes 230d may be layers in which some of the second upper insulating layers 280 are replaced with a conductive material. The second dummy gate electrodes 230d are disposed at substantially the same height level as the second upper insulating layers 280 and may have substantially the same thickness as the second upper insulating layers 280.

The first and second dummy gate electrodes 130d and 230d may be separated in the X direction by a pair of second separation structures MS2, adjacent to each other and extending in the Y direction, to each extend in the Y direction. The first lower and upper insulating layers 170 and 270 may also be separated in the X direction by a pair of second separation structures MS2, adjacent to each other and extending in the Y direction, to each extend in Y direction. The first and second dummy gate electrodes 130d and 230d may include the same material as the first and second gate electrodes 130 and 230.

Each of the dummy channel structures DCH may penetrate through the dummy stack structures DS1 and DS2 in a vertical direction, for example, in the Z direction. Each of the dummy channel structures DCH may have a shape, in which a lower dummy channel structure penetrating through the first lower insulating layers 170 and the first dummy gate electrodes 130d and an upper dummy channel structure penetrating through the first upper insulating layers 270 and the second dummy gate electrodes 230d are connected to each other, and may have a bent portion (also referred to as a bent region) formed by a difference or change in widths in the connection region. The bent portion may be disposed between the first dummy gate group of the first dummy gate electrodes 130d and the second dummy gate group of the second dummy gate electrodes 230d. The dummy channel structures DCH may have a structure substantially the same as or similar to the channel structures CH. A detailed structure of the dummy channel structures DCH will be described later in more detail with reference to FIGS. 3A and 3C.

As illustrated in FIG. 2A, the second separation structures MS2 may penetrate through the dummy stack structures DS1 and DS2 in a vertical direction, for example, in the Z direction. The second separation structures MS2 may separate the dummy gate electrodes 130d and 230d of the dummy stack structures DS1 and DS2 in the X direction. As illustrated in FIG. 1, the second separation structures MS2 may extend in the Y direction. The second separation structures MS2 may be disposed to be spaced apart from each other in the X direction and to be side by side with each other. The second separation structures MS2 may penetrate through the dummy gate electrodes 130d and 230d in the Z direction to be in contact with the second substrate 101. The second separation structures MS2 may be disposed to recess a portion of an upper portion of the second substrate 101, or may be disposed on the second substrate 101 to be in contact with the upper surface of the second substrate 101. The second separation structures MS2 may be formed in the same process as the first separation structures MS1, but may be formed in a process different from a process of the first separation structures MS1. The second separation structures MS2 may include an insulating material, for example, a silicon oxide, a silicon nitride, or a combination thereof.

Since the gate electrodes 130 and 230 separated by the first separation structures MS1 extend in only one direction (the X direction), a stack structure may be vulnerable to warpage during a process of manufacturing a semiconductor device or a semiconductor package. In the present disclosure, the second separation structures MS2 may penetrate through the dummy stack structures DS1 and DS2 and may extend in the Y direction different from the direction, in which the first separation structures MS1 extends, and the dummy gate electrodes 130d and 230d extends in the Y direction, so warpage of the vulnerable stack structure in only one direction may be compensated. Accordingly, the reliability of a semiconductor device may be improved.

The capping insulating layers 190 and 290 may include a first capping insulating layer 190, covering the first stack structure GS1 and the first dummy stack structure DS1, and a second dummy stack structure DS2 covering the second stack structure GS2 and the second dummy stack structure DS2. The first capping insulating layer 190 and the second capping insulating layer 290 may include an insulating material, for example, a silicon oxide.

The contact plugs CNT may be electrically connected to the gate electrodes 130 and 230 on the cell staircase region CB, respectively. The contact plugs CNT may penetrate through the capping insulating layers 190 and 290 on the cell staircase region CB to be connected to the gate electrodes 130 and 230 exposed upwardly by the first staircase structure SR1, respectively. A portion of the contact plugs CNT may be connected to the second substrate 101. The contact plugs CNT may be connected to additional contact plugs PL thereabove to be connected to the upper interconnections UP. The contact plugs CNT may include a conductive material. The contact plugs CNT may include through-contact plugs penetrating through the second substrate 101 and extending in a vertical direction, for example, the Z direction to be electrically connected to the circuit elements 20 of the peripheral circuit region PERI.

The upper contact plugs PL may be connected to the channel structures CH on the cell array region CA, and may be connected to the contact plugs CNT on the cell staircase region CB. The upper contact plugs PL may be connected to the channel pads 155 of the channel structures CH. The upper interconnections UP may be disposed on the upper contact plugs PL. The upper contact plugs PL may include a conductive material.

The upper interconnections UP may constitute an interconnection structure electrically connected to memory cells in the memory cell region CELL. Among upper interconnections UP, some interconnections UP may include bitlines connected to the channel structures CH. Among upper interconnections UP, some interconnections UP may be electrically connected to, for example, the gate electrodes 130 and 230. The number of contact plugs and interconnection lines, constituting the interconnection structure, may vary in some example embodiments. The upper interconnections UP may include the conductive material.

Figure 2B:
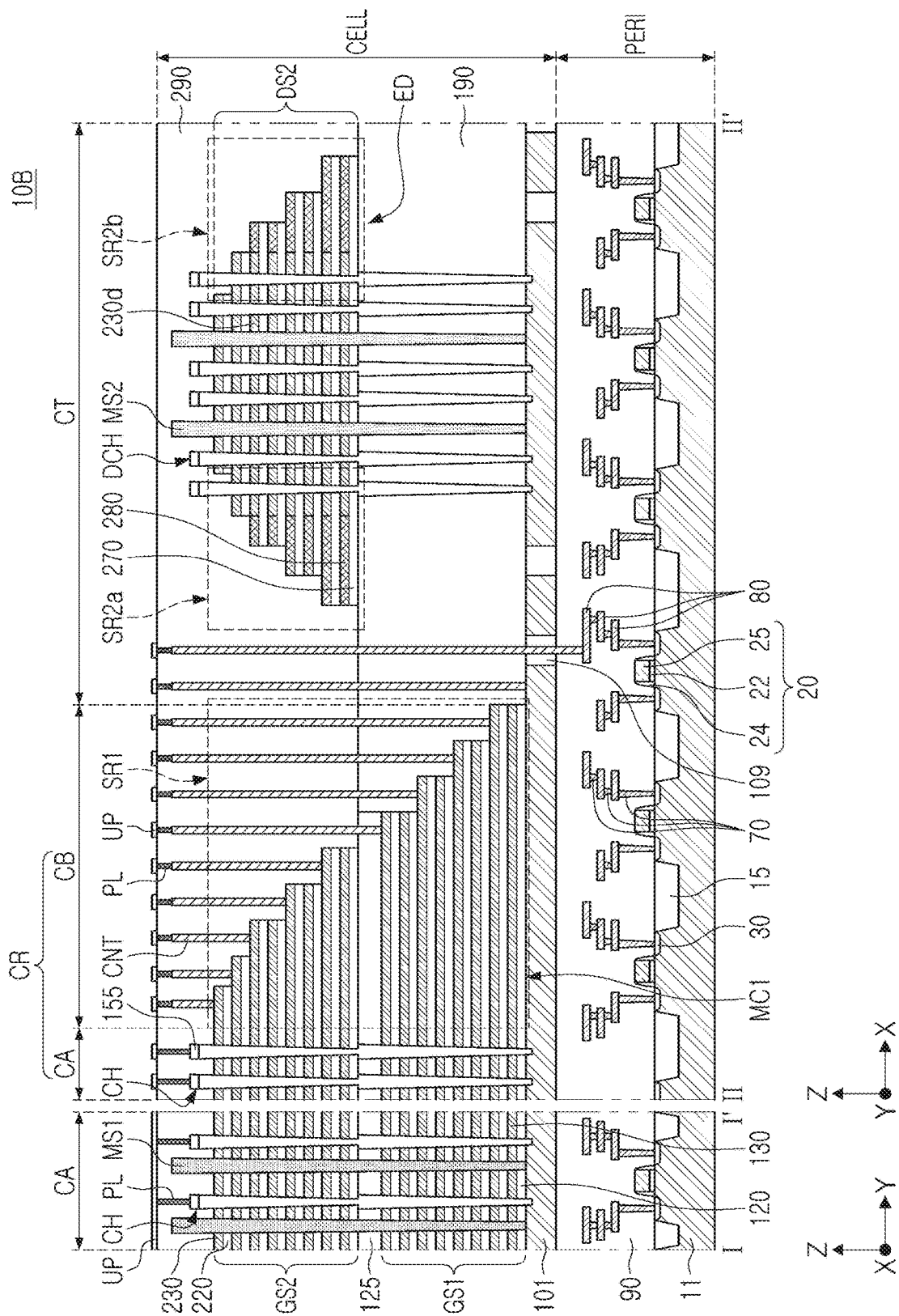

FIG. 2B is a schematic cross-sectional view of a semiconductor device according to some example embodiments. FIG. 2B illustrates a region corresponding to FIG. 2A.

Referring to FIG. 2B, in a semiconductor device 10B, a dummy structure ED may not include a first dummy stack structure DS1, but may include a second dummy stack structure DS2, a dummy channel structures DCH, and second separation structures MS2. The second dummy stack structure DS2 may be disposed on a level higher than a level of a first gate group of first gate electrodes 130. A lower dummy channel structure of the dummy channel structure DCH may penetrate through a first capping insulating layer 190, and an upper dummy channel structure of the dummy channel structure DCH may penetrate through the second dummy stack structure DS2.

Figure 2C:
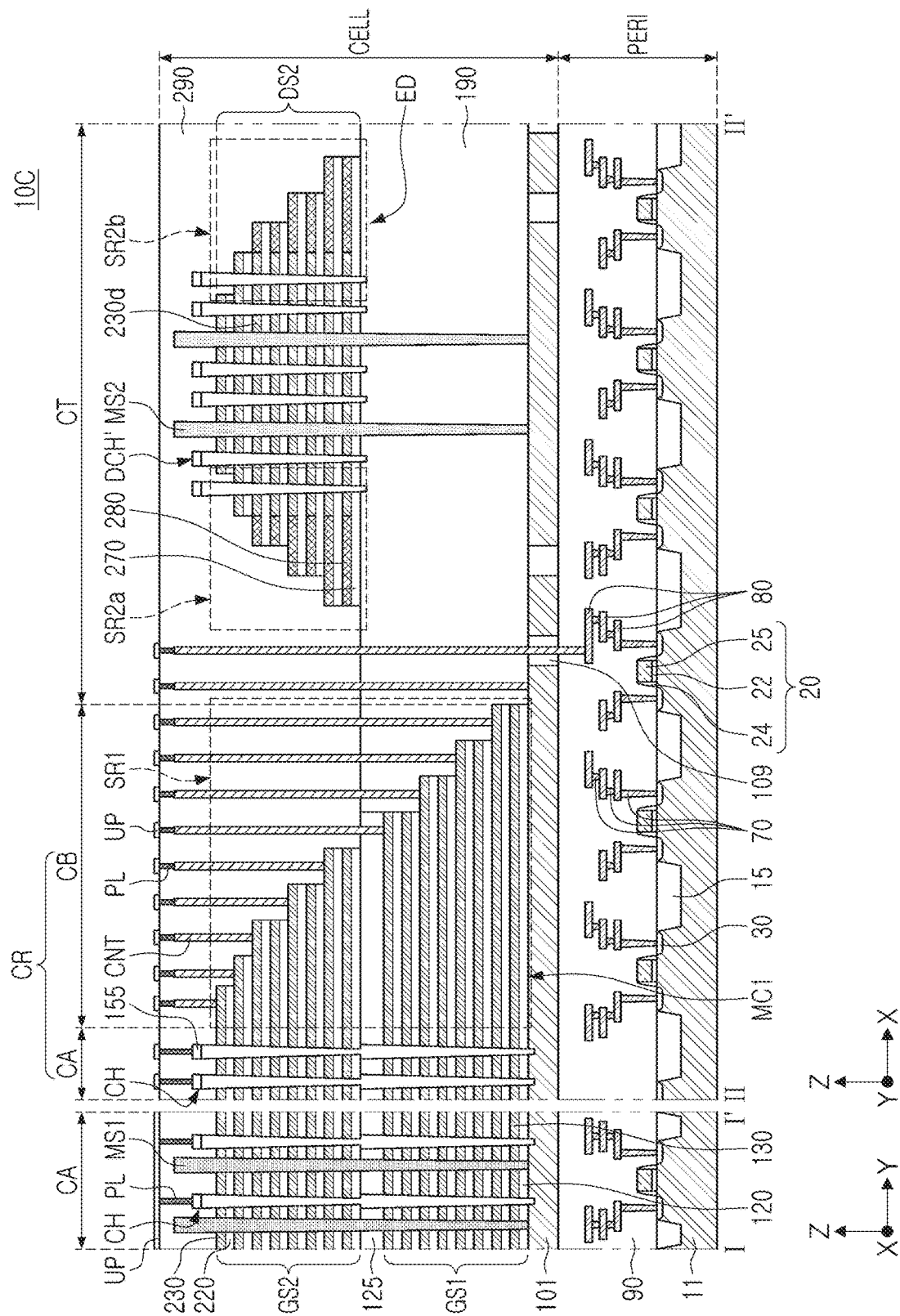

FIG. 2C is a schematic cross-sectional view of a semiconductor device according to some example embodiments. FIG. 2C illustrates a region corresponding to FIG. 2A.

Referring to FIG. 2C, in a semiconductor device 10C, a dummy structure ED may not include a first dummy stack structure DS1, but may include a second dummy stack structure DS2, a dummy channel structures DCH, and second separation structures MS2. Unlike a channel structure CH, the dummy channel structure DCH may penetrate through the second dummy stack structure DS2 and may recess a portion of an upper region of a first capping insulating layer 190.

Figure 3A:
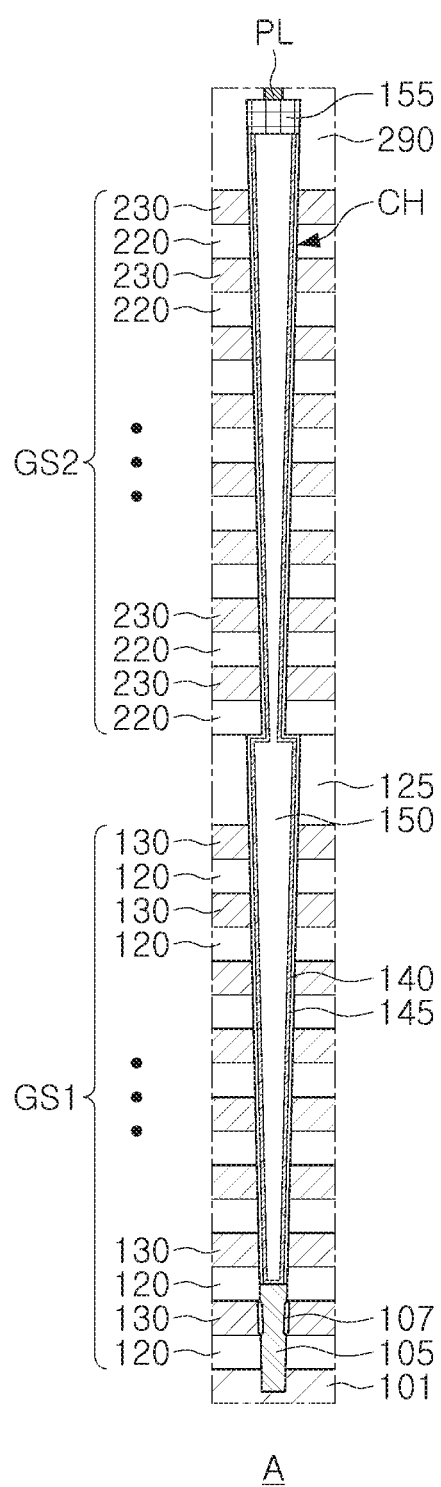
FIGS. 3A to 3E are enlarged, partially schematic cross-sectional views of semiconductor devices according to some example embodiments.

FIGS. 3A to 3E are enlarged, partially schematic cross-sectional views of semiconductor devices according to some example embodiments. FIG. 3A is an enlarged view of a region corresponding to region "A" of FIG. 2A.

Referring to FIG. 3A, the channel structure CH may include a channel layer 140, a channel insulating layer 150, a channel pad 155, a gate dielectric layer 145, and an epitaxial layer 105. Each of the channel layer 140, the gate dielectric layer 145, and the channel insulating layer 150 may be connected between the lower channel structure and the upper channel structure. A dummy channel structure DCH may also have a structure similar to the channel structure CH of FIG. 3A.

The channel layer 140 may be formed in an annular shape surrounding an internal channel insulating layer 150, but may have a columnar shape such as a cylindrical shape or a prismatic shape without the channel insulating layer 150. The channel layer 140 may be connected to the epitaxial layer 105 therebelow to be electrically connected to the second substrate 101. The channel layer 140 may include a semiconductor material such as polycrystalline silicon or single crystal silicon, and the semiconductor material may be an undoped material or a material including P-type or N-type impurities.

A channel pad 155 may be disposed on the channel layer 140 in the channel structure CH. The channel pad 155 may be disposed to cover a lower surface of the channel insulating layer 150 and to be electrically connected to the channel layer 140. The channel pad 155 may include, for example, doped polycrystalline silicon.

The gate dielectric layer 145 may be disposed between the gate electrodes 130 and 230 and the channel layer 140. Although not illustrated in detail, the gate dielectric layer 145 may include a tunneling layer, a data storage layer, and a blocking layer sequentially stacked from the channel layer 140. The tunneling layer may tunnel electric charges to the data storage layer, and may include, for example, a silicon oxide, a silicon nitride, a silicon oxynitride, or any combinations thereof. The data storage layer may be a charge trapping layer or a floating gate conductive layer. The blocking layer may include a silicon oxide, a silicon nitride, a silicon oxynitride, a high-k dielectric material, or any combination thereof.

The epitaxial layer 105 may be disposed on an upper surface of the second substrate 101 on a lower end of the channel structure CH, and may be disposed on a side surface of at least one first gate electrode 130. The epitaxial layer 105 may be connected to the channel layer 140. The epitaxial layer 105 may be disposed in a recessed region of the second substrate 101. An insulating layer 107 may be disposed between the epitaxial layer 105 and the lower gate electrode 130. In some example embodiments, the epitaxial layer 105 may be omitted. In this case, the channel layer 140 may be directly connected to the second substrate 101, or may be connected to an additional conductive layer on the second substrate 101.

FIGS. 3A to 3E are enlarged, partially schematic cross-sectional views of semiconductor devices according to some example embodiments. FIGS. 3B to 3E are enlarged views of regions corresponding to regions "A," "B," "C," and "D" of FIG. 2A, respectively.

Referring to FIGS. 3B to 3E, first and second horizontal conductive layers 102 and 104 may be sequentially stacked and disposed on an upper surface of a cell array region CA of a second substrate 101. Although not illustrated in the drawings, the first horizontal conductive layer 102 may not extend upwardly of a cell staircase region CB of a second substrate 101, and the second horizontal conductive layer 104 may extend upwardly of the cell staircase region CB.

Figure 3B:
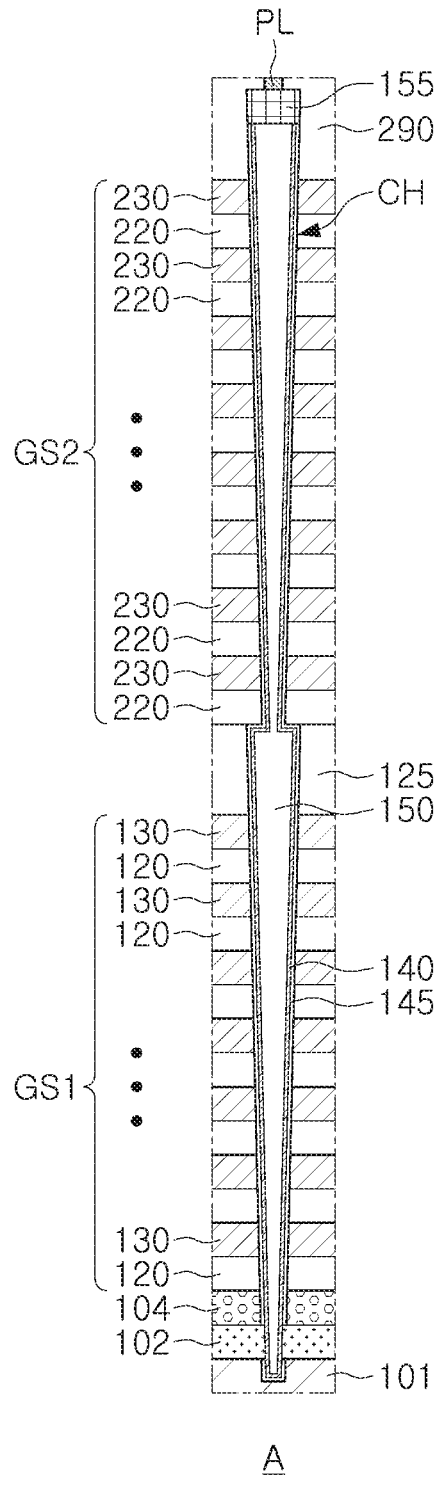
Figure 3C:
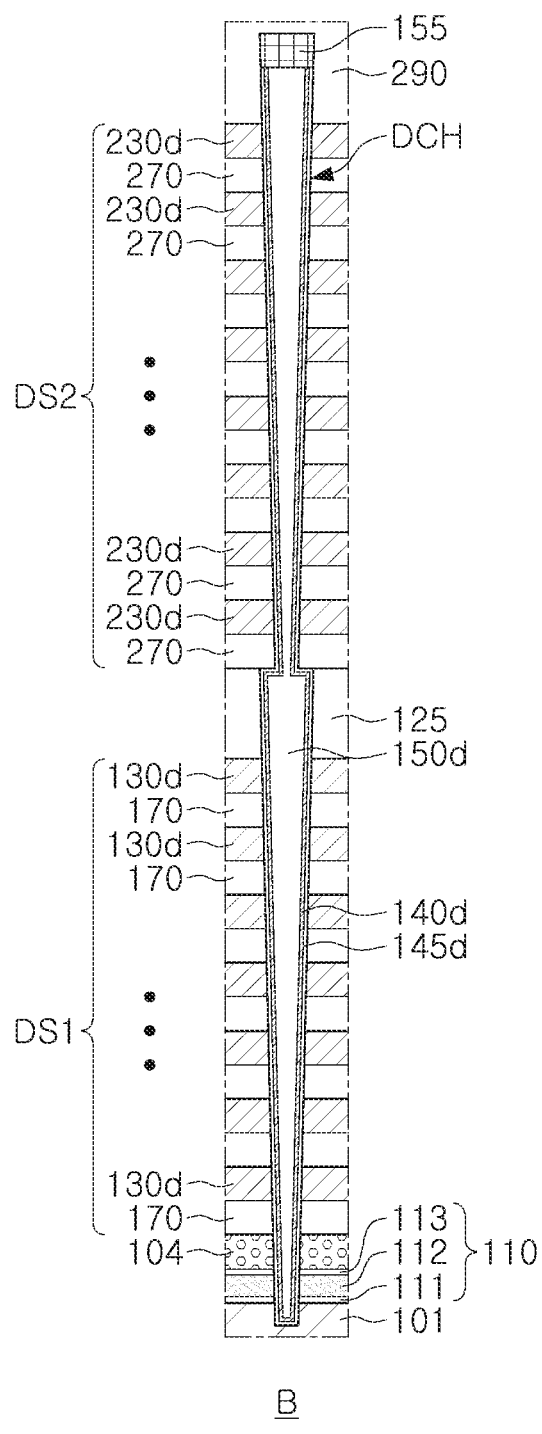

The first horizontal conductive layer 102 may function as a portion of a common source line of a semiconductor device, for example, may function as a common source line together with the second substrate 101. As illustrated in FIG. 3B, a first horizontal conductive layer 102 may be directly connected to a channel layer 140 around a channel layer 140 of a channel structure CH. As illustrated in FIG. 3C, a portion of side surfaces of a dummy channel layer 140d of a dummy channel structure DCH may be surrounded by a horizontal insulating layer 110.

The second horizontal conductive layer 104 may be in contact with the second substrate 101 in some regions in which a first horizontal conductive layer 102 and the horizontal insulating layer 110 are not disposed. The second horizontal conductive layer 104 may be bent to cover an end portion of a first horizontal conductive layer 102 or the horizontal insulating layer 110 in the regions to extend upwardly of the second substrate 101.

The first and second horizontal conductive layers 102 and 104 may include a semiconductor material. For example, both the first and second horizontal conductive layers 102 and 104 may include polycrystalline silicon. In this case, at least the first horizontal conductive layer 102 may be a doped layer, and the second horizontal conductive layer 104 may be a doped layer or a layer containing impurities diffused from the first horizontal conductive layer 102. However, in some example embodiments, the second horizontal conductive layer 104 may be replaced with an insulating layer.

The horizontal insulating layer 110 may be disposed on the second substrate 101 in parallel to the first horizontal conductive layer 102 on at least a portion of the cell staircase region CB. The horizontal insulating layer 110 may include first to third horizontal insulating layers 111, 112, and 113 sequentially stacked on the cell staircase region CB and a peripheral region CT of the second substrate 101. The horizontal insulating layer 110 may be a layer remaining after a portion of the horizontal insulating layer 110 is replaced with the first horizontal conductive layer 102 in a process of manufacturing the semiconductor device 10A. The horizontal insulating layer 110 may be disposed to cover a portion of the second substrate 101 on the peripheral area CT.

The horizontal insulating layer 110 may include a silicon oxide, a silicon nitride, a silicon carbide, or a silicon oxynitride. The first and third horizontal insulating layers 111 and 113 and the second horizontal insulating layer 112 may include different insulating materials. The first and third horizontal insulating layers 111 and 113 may include the same material. For example, the first and third horizontal insulating layers 111 and 113 are formed of the same material as the interlayer insulating layers 120 and 220, and the second horizontal insulating layer 112 may be formed of the same material as the sacrificial insulating layers 118 and 218.

As illustrated in FIG. 3C, dummy channel structures DCH may include a dummy channel layer 140d, a dummy gate dielectric layer 145d, a dummy channel insulating layer 150d, and a channel pad 155. Unlike the channel structures CH, the dummy channel structures DCH may penetrate through the horizontal insulating layer 110 to be in contact with the second substrate 101.

Figure 3D:
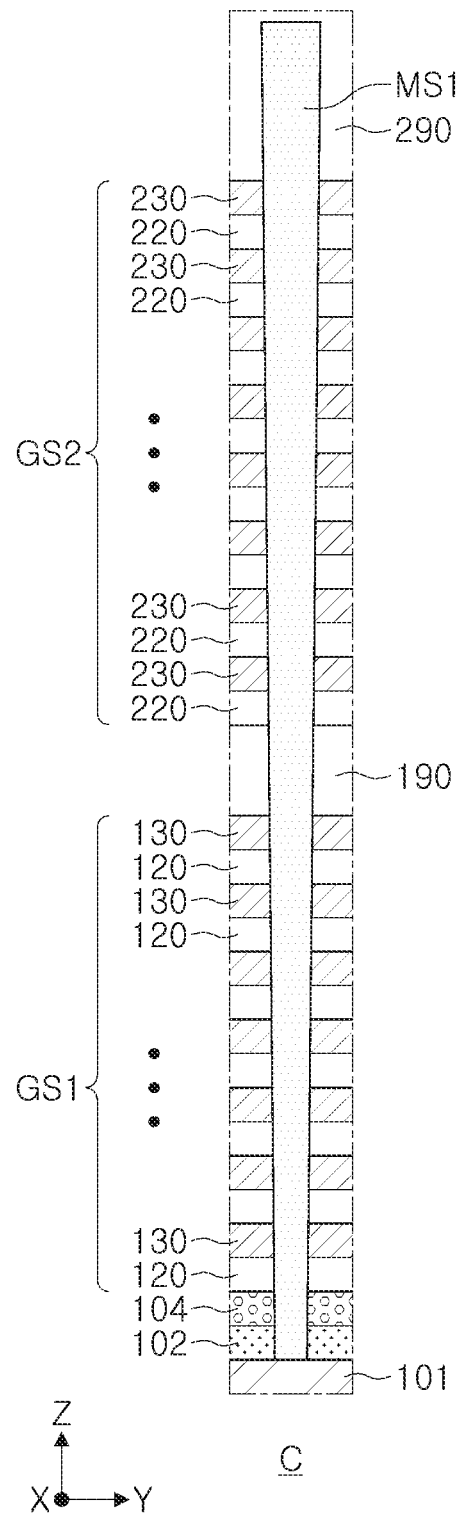
Figure 3E:
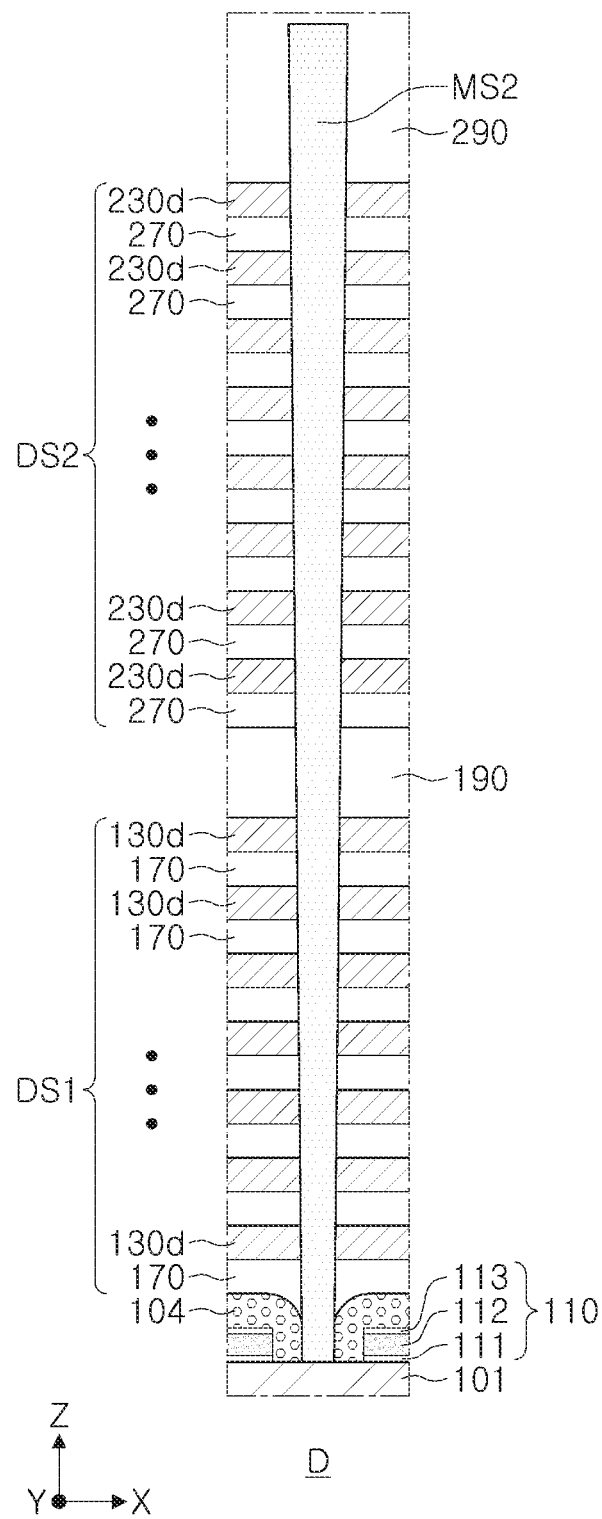

As illustrated in FIG. 3D, a first separation structure MS1 may be disposed to penetrate through first and second horizontal conductive layers 102 and 104 in a vertical direction, for example, in a Z direction. As illustrated in FIG. 3E, the second horizontal conductive layer 104 may cover an end portion of the horizontal insulating layer 110, and may be bent to be in contact with the second substrate 101. The second separation structure MS2 may be disposed to penetrate through the second horizontal conductive layer 104 in contact with the second substrate 101 in the Z direction.

FIGS. 4A to 4D are schematic plan views of semiconductor devices according to some example embodiments.

Figure 4A:
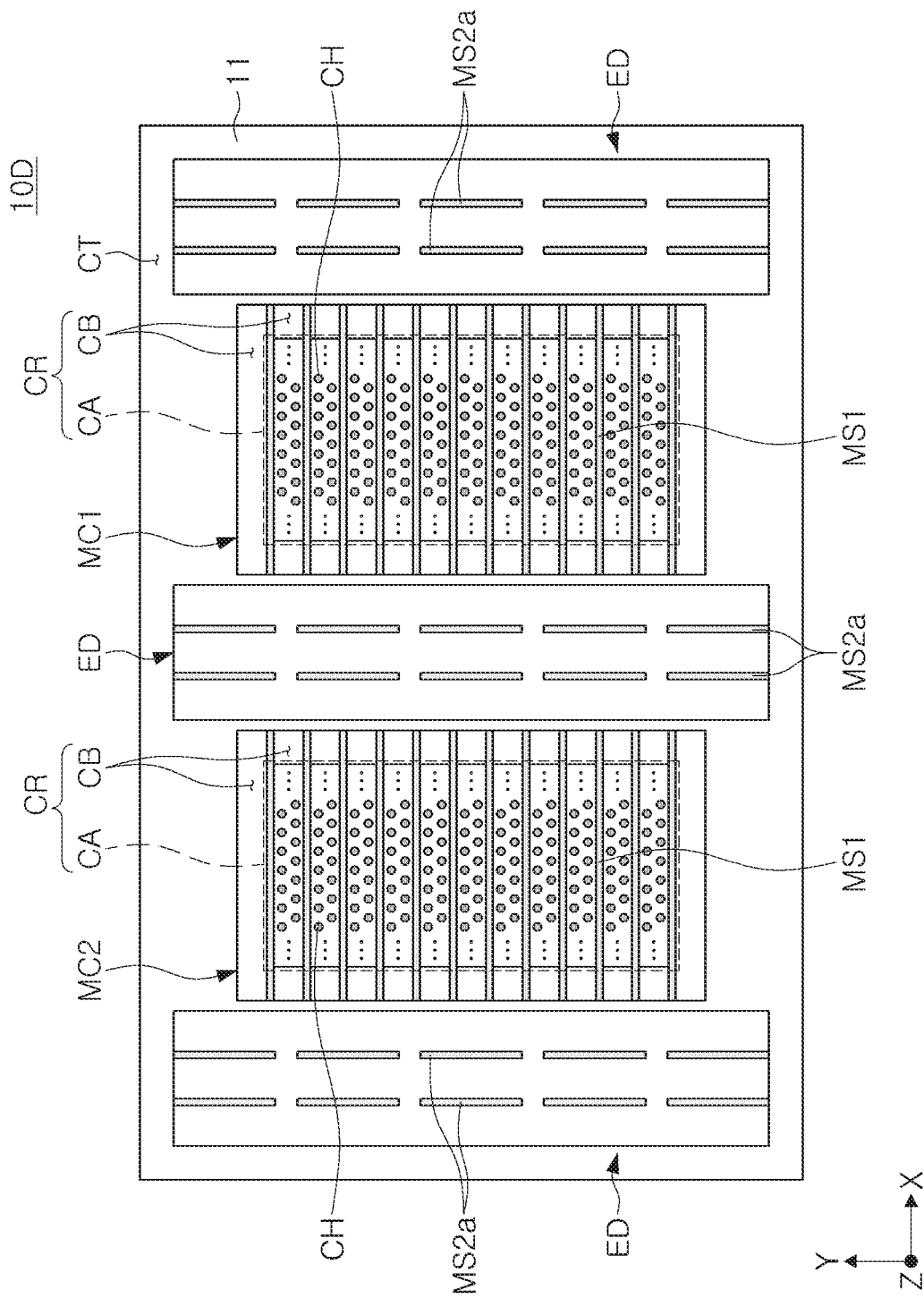
FIGS. 4A to 4D are schematic plan views of semiconductor devices according to some example embodiments.

Referring to FIG. 4A, in a semiconductor device 10D, second separation structures MS2a may be intermittently disposed in a Y direction. For example, the second separation structures MS2a may be spaced apart from each other in an X direction to be side by side with each other, and may also be spaced apart from each other in the Y direction. The dummy gate electrodes 130d and 230d may extend to a certain region in which the second separation structures MS2a are spaced apart from each other in the Y direction. This may be formed by removing a portion of second lower and upper insulating layers 180 and 280 from openings of the second separation structures MS2a and filling the removed region with a conductive material.

Figure 4B:
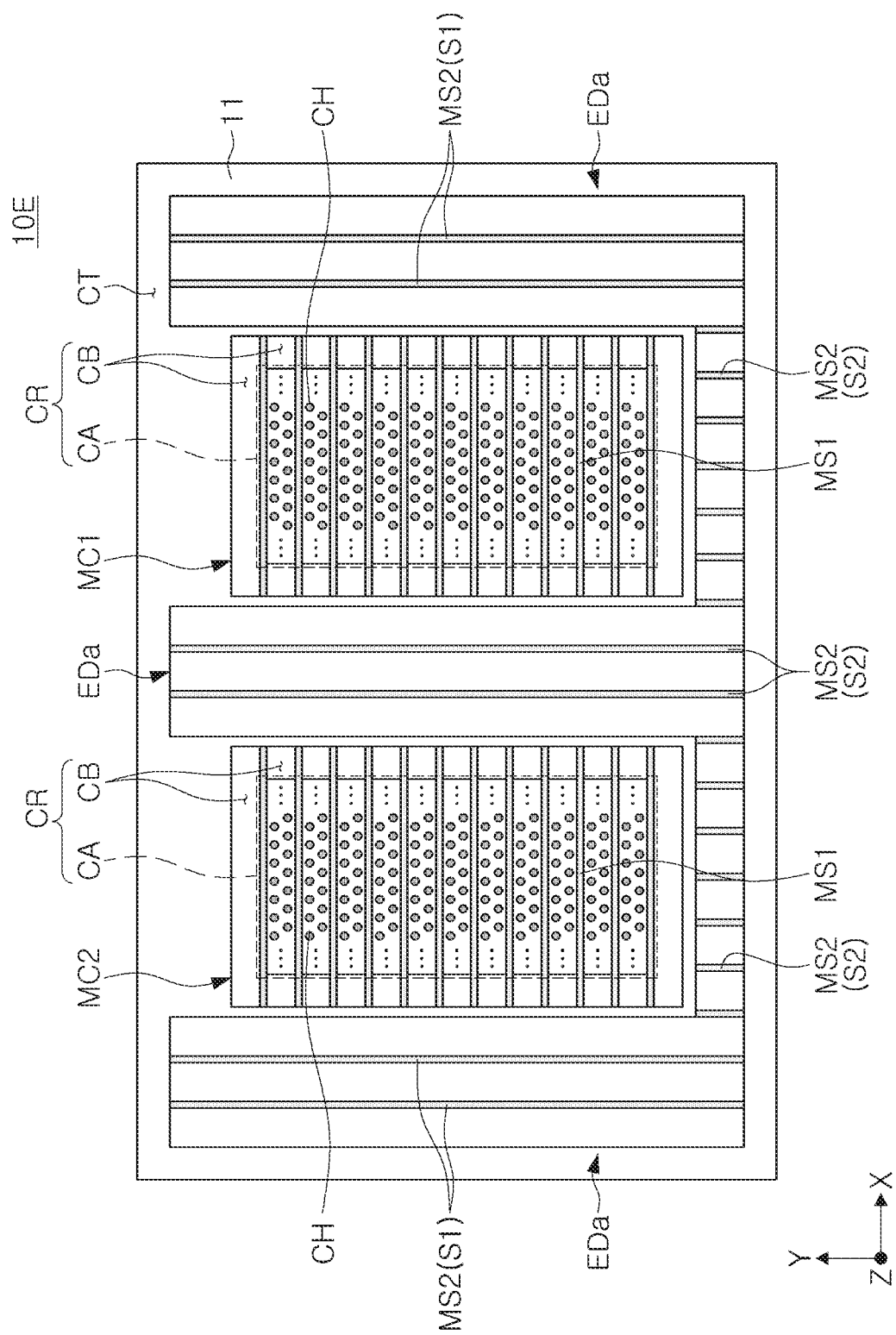

Referring to FIG. 4B, in a semiconductor device 10E, a dummy structure EDa may be disposed to surround three side regions of memory cell structures MC1 and MC2. For example, the dummy structure EDa may be disposed on opposite sides of the first memory cell structure MC1 in an X direction, and may also be disposed on one side of the first memory cell structure MC1 in a Y direction. The second separation structures MS2 may include a first separation pattern S1 and a second separation pattern S2 having different lengths in the Y direction. The first separation pattern S1 may be provided as a plurality of first separation patterns S1 disposed on opposite sides of the memory cell structure MC1 in the X direction, and the second separation pattern S2 may be provide as a plurality of second separation patterns S2 disposed on one side of the memory cell structure MC1 in the Y direction. The first separation pattern S1 may have a greater length than the second separation pattern S2 in the Y direction.

Figure 4C:
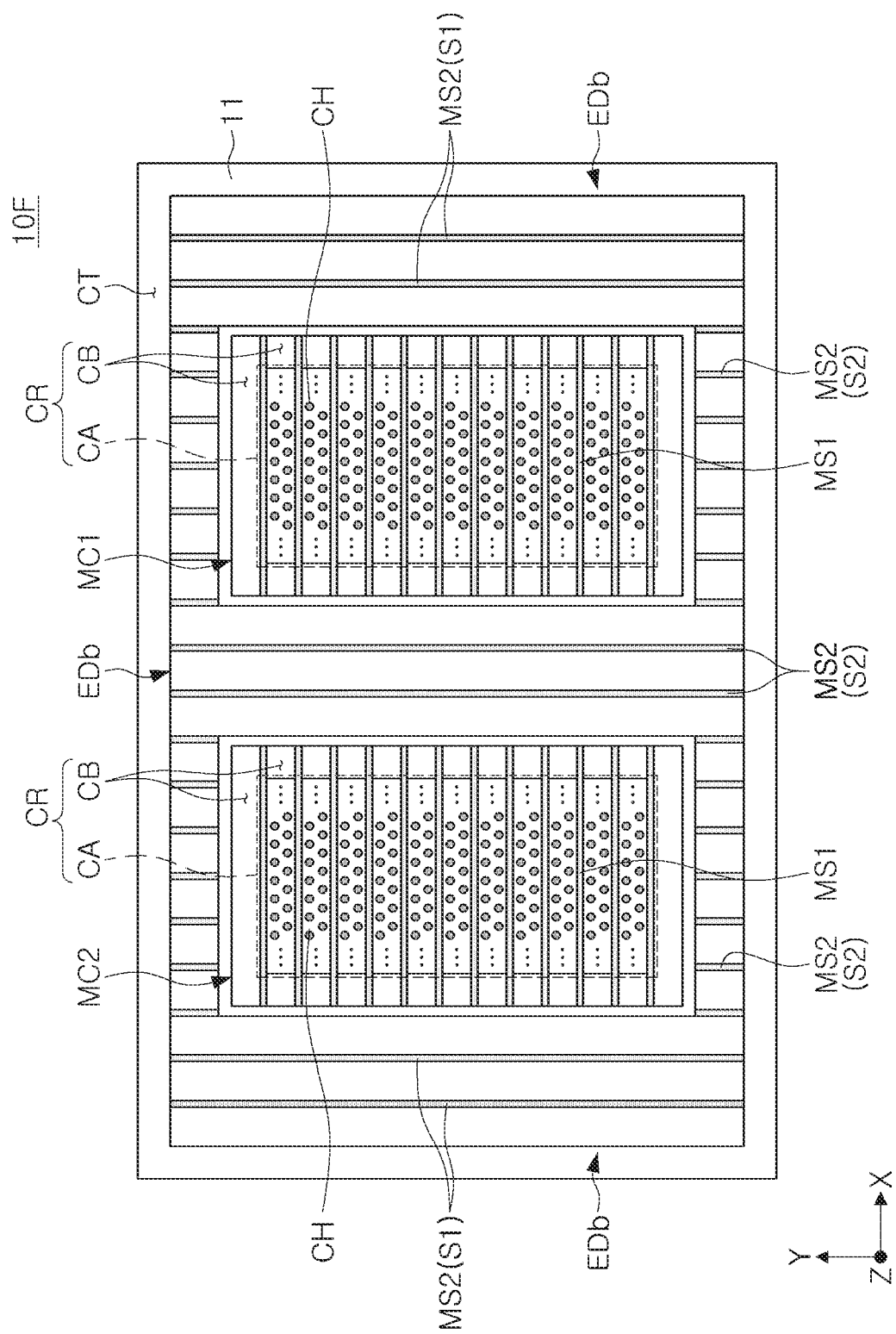

Referring to FIG. 4C, in a semiconductor device 10F, a dummy structure EDb may be disposed in the form of a fence fully surrounding memory cell structures MC1 and MC2. For example, the dummy structure EDb may be disposed on opposite sides of the first memory cell structure MC1 in an X direction, and may also be disposed on opposite sides of the first memory cell structure MC1 in a Y direction. Similarly to the embodiment of FIG. 4B, the second separation structures MS2 may include first and second separation patterns S1 and S2.

Figure 4D:
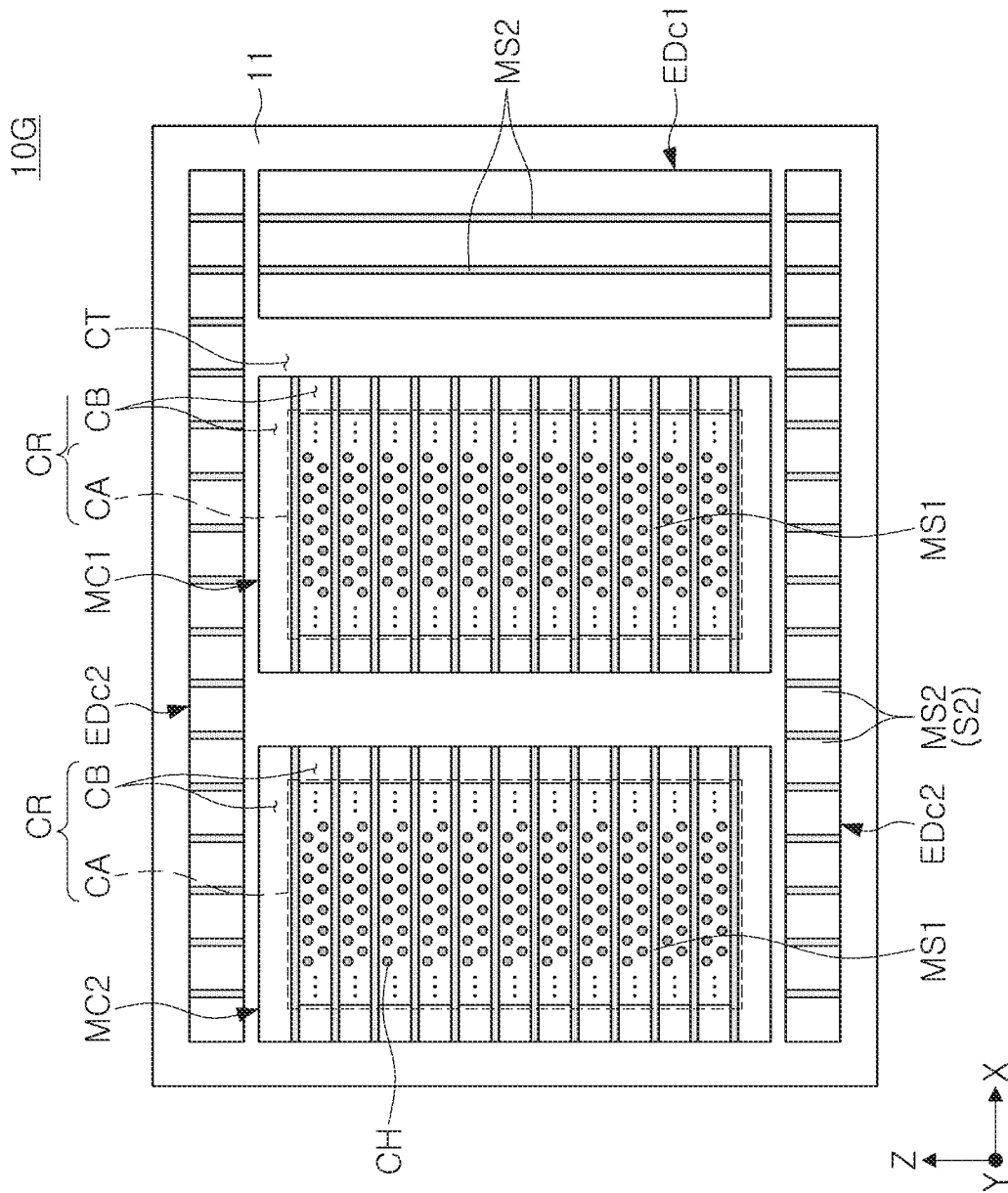

Referring to FIG. 4D, in a semiconductor device 10G, first and second memory cell structures MC1 and MC2 may be disposed to be adjacent to each other, and a dummy structure EDc1 may be disposed to be side by side with the first memory cell structure MC1. The other dummy structures EDc2 may be spaced apart from the first and second memory cell structures MC1 and MC2 and the dummy structure EDc1 to be side by side with each other to opposite sides of the first and second memory cell structures MC1 and MC2. Similarly to the embodiment of FIG. 4B, the second separation structures MS2 may include first and second separation patterns S1 and S2.

Figure 5:
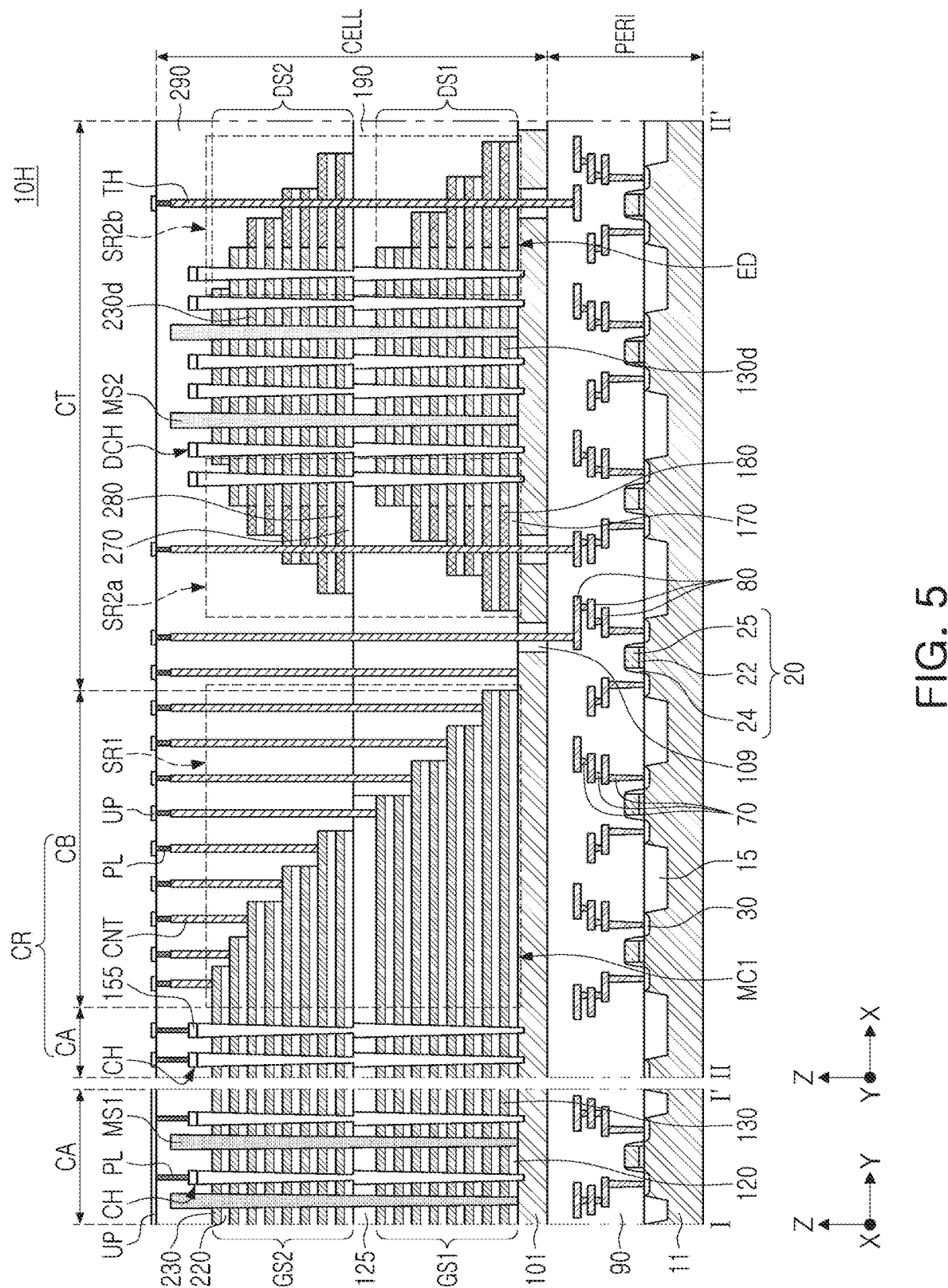
FIG. 5 is a schematic cross-sectional view of a semiconductor device according to some example embodiments.

FIG. 5 is a schematic cross-sectional view of a semiconductor device according to some example embodiments. FIG. 5 illustrates a region corresponding to FIG. 2A.

Referring to FIG. 5, a semiconductor device 10H may further include through-contact plugs TH penetrating through a second substrate 101 in a peripheral region CT. The through-contact plugs TH may penetrate through at least a portion of insulating layers 170, 180, 270, and 280 of dummy stack structures DS1 and DS2. A substrate insulating layer 109 may surround a portion of side surfaces of the through-contact plugs TH. The substrate insulating layer 109 may be formed by forming an insulating layer in a region, in which a portion of a second substrate 101 is removed, and then performing a planarization process. The substrate insulating layer 109 may be formed by filling the region with the same material as a material forming the interlayer insulating layer 120. The disposition of the substrate insulating layer 109 may vary in some example embodiments.

Figure 6A:
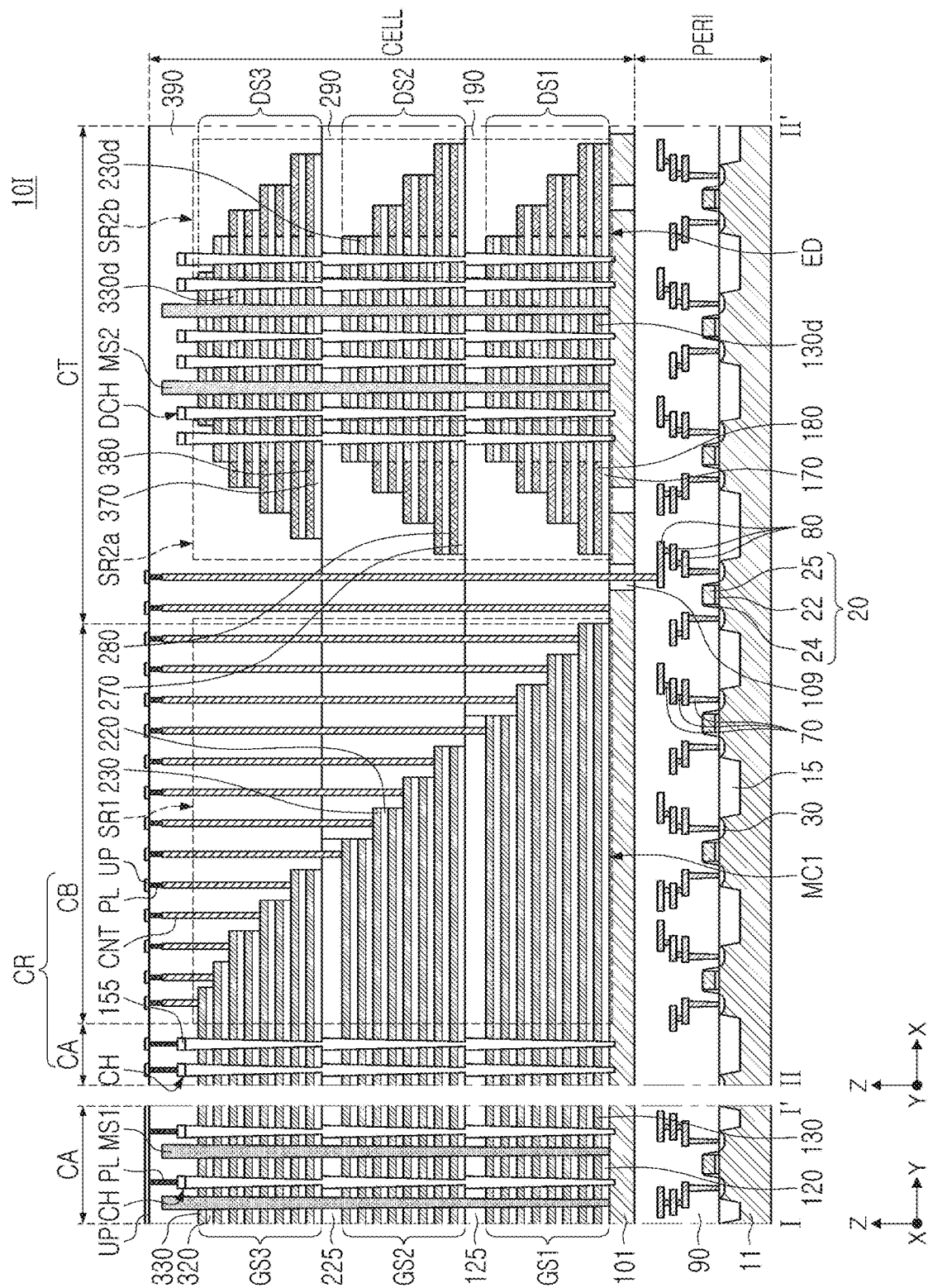
FIGS. 6A and 6B are schematic cross-sectional views of semiconductor devices according to some example embodiments.
Figure 6B:
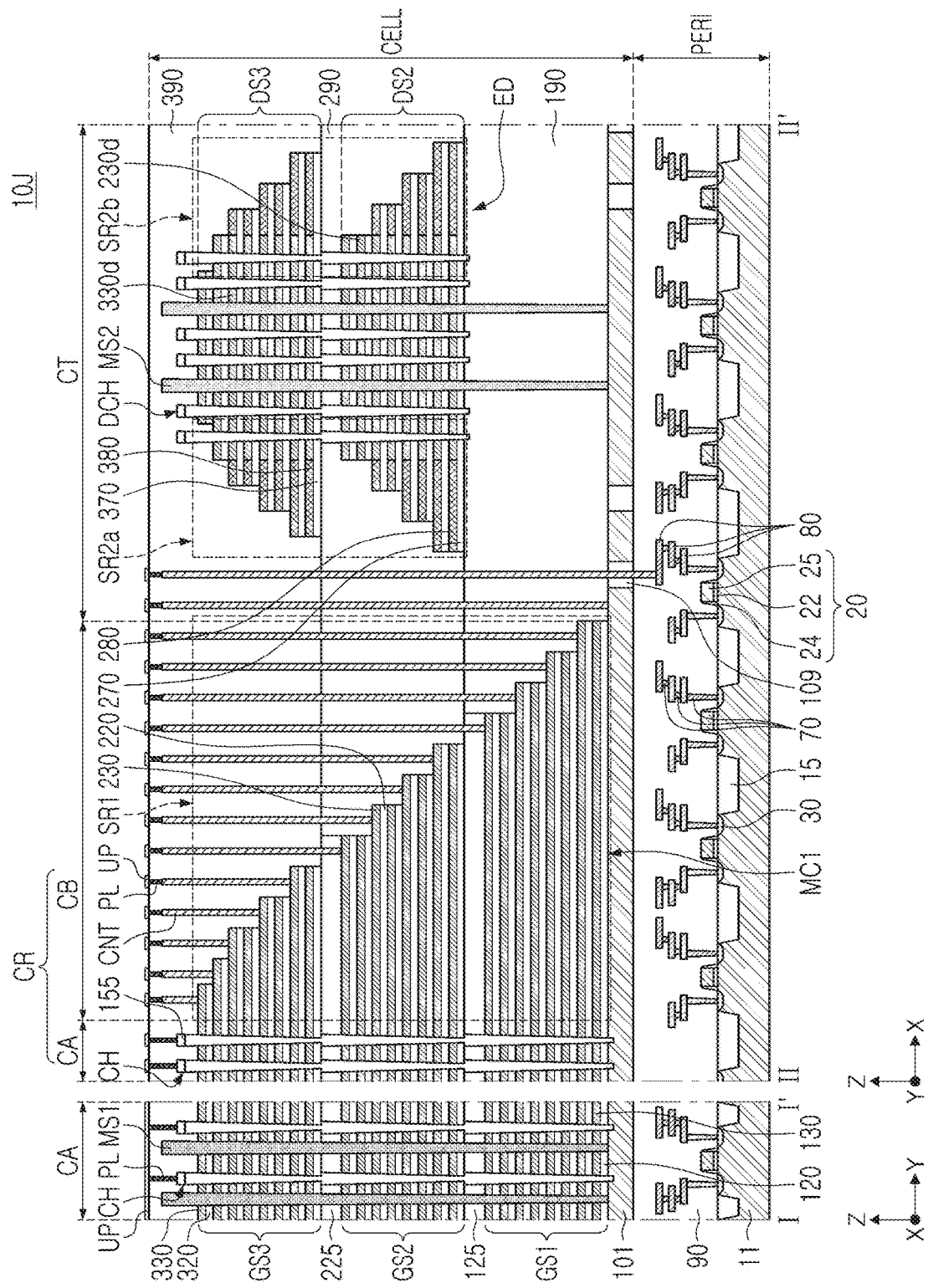

FIGS. 6A and 6B are schematic cross-sectional views of semiconductor devices according to some example embodiments.

Referring to FIGS. 6A and 6B, memory cell regions CELL of semiconductor devices 10I and 10J may further include a third stack structure GS3 and a third dummy stack structure DS3. In the above-described embodiments, stack structures of a memory cell structure are illustrated as having a double-stacked structure. Meanwhile, in some example embodiments of FIGS. 6A and 6B, stack structures of a memory cell structure are illustrated as having a triple-stacked structure. The semiconductor devices 10I and 10J may further include a third capping insulating layer 390 and a connection insulating layer 225.

A third stack structure GS3 may include a third interlayer insulating layer 320 and third gate electrodes 330 alternately stacked. A description of the third interlayer insulating layers 320 will refer to the descriptions of the first and second interlayer insulating layers 120 and 220, and a description of the third gate electrodes 330 will refer to the descriptions of the first and second gate electrodes 130 and 230.

The third dummy stack structure DS3 may be disposed on the first and second dummy structures DS1 and DS2. The third dummy stack structure DS3 may be disposed to be spaced apart from the third stack structure MC3 of the memory cell structure MC1. The third dummy stack structure DS3 may include third insulating layers 370, fourth insulating layers 380, and third dummy gate electrodes 330d. A description of the third dummy stack structure DS3 will refer to a description of the first stack structure DS1 or the second dummy stack structure DS2.

The channel structures CH and the first separation structures MS1 may be disposed to penetrate through first to third memory cell structures MC1, MC2, and MC3. Upper interconnections UP may be disposed on the third memory cell structure MC3 and a third capping insulating layer 390. Contact plugs CNT and upper contact plugs PL may be disposed on the third memory cell structure MC3 to be connected to the gate electrodes 130, 230, and 330 and channel structures CH.

As compared with the semiconductor device 10I of FIG. 6A, a semiconductor device 10J of FIG. 6B may not include a first dummy stack structure DS1 and dummy channel structures DCH may be disposed so as not to be in contact with a second substrate 101. A determination, made as to whether each of the dummy stack structures DS1, DS2, and DS3 is disposed, and a shape of the dummy channel structures DCH may vary in some example embodiments.

Embodiments of inventive concepts may also be applied to embodiments in which stack structures of a memory cell structure have a multi-stack structure of four or more stacked. Even in this case, second separation structures MS2 may penetrate through the dummy stack structures DS1, DS2, and DS3 in a Z direction to extend in a Y direction. In addition, the present disclosure may be applied to an example embodiment in which a stack structure of a memory cell structure has a single-stacked structure.

Figure 7:
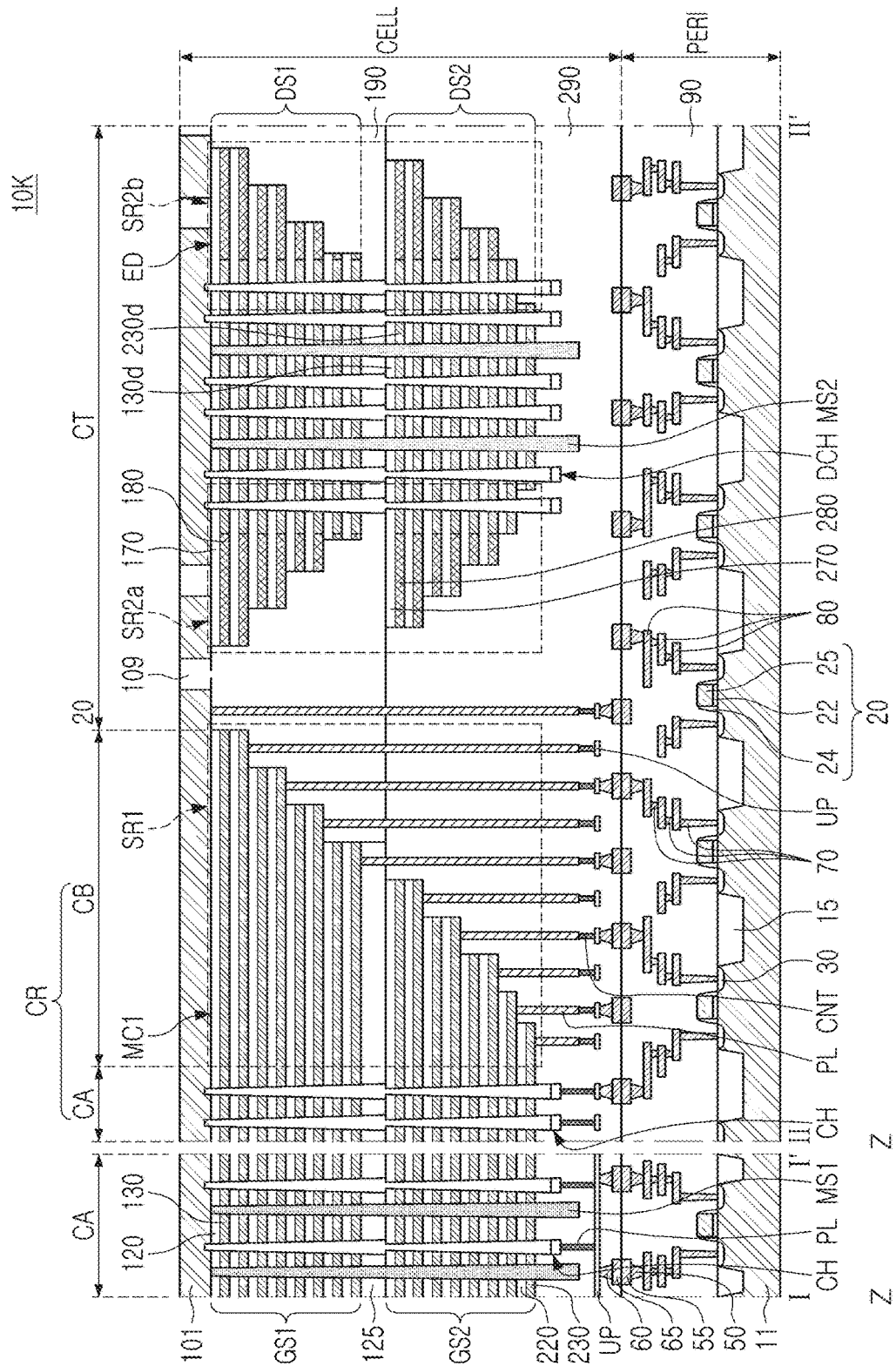
FIG. 7 is a schematic cross-sectional view of a semiconductor device according to some example embodiments.

FIG. 7 is a schematic cross-sectional view of a semiconductor device according to some example embodiments.

Referring to FIG. 7, a semiconductor device 10K may include a memory cell structure CELL, including a first separation structures MS1 and a second separation structures MS2, and a peripheral circuit structure PERI described above with reference to FIG. 2A. The memory cell structure CELL and the peripheral circuit structure PERI may be bonded to each other through a bonding structure. The memory cell structure CELL of the semiconductor device 10K is illustrated by vertically reversing the memory cell structure CELL of the semiconductor device 10A of FIG. 2A, and may further include upper bonding structures 60 and 65 connected to upper interconnections UP. The peripheral circuit structure PERI may further include lower bonding structures 50 and 55 bonded to the upper bonding structures 60 and 65 and connected to circuit interconnection lines 80.

The lower bonding structures 50 and 55 may include a lower bonding via 50, connected to the circuit interconnection lines 80, and a lower bonding pad 55 connected to the lower bonding via 50. The upper bonding structures 60 and 65 may include an upper bonding via 60, connected to the upper interconnections UP, and an upper bonding pad 65 connected to the upper bonding via 60. Each of the lower bonding structures 50 and 55 and the upper bonding structures 65 and 65 may include, for example, tungsten (W), aluminum (Al), copper (Cu), tungsten nitride (WN), tantalum nitride (TaN), titanium nitride (TiN), or any combinations thereof. The lower bonding pad 55 and the upper bonding pad 65 may function as bonding layers for bonding the peripheral circuit structure PERI and the memory cell structure CELL. In addition, the lower bonding pad 55 and the upper bonding pad 65 may provide an electrical connection path between the peripheral circuit structure PERI and the memory cell structure CELL.

FIGS. 8A to 8F are cross-sectional views illustrating a method of manufacturing a semiconductor device according to some example embodiments.

Figure 8A:
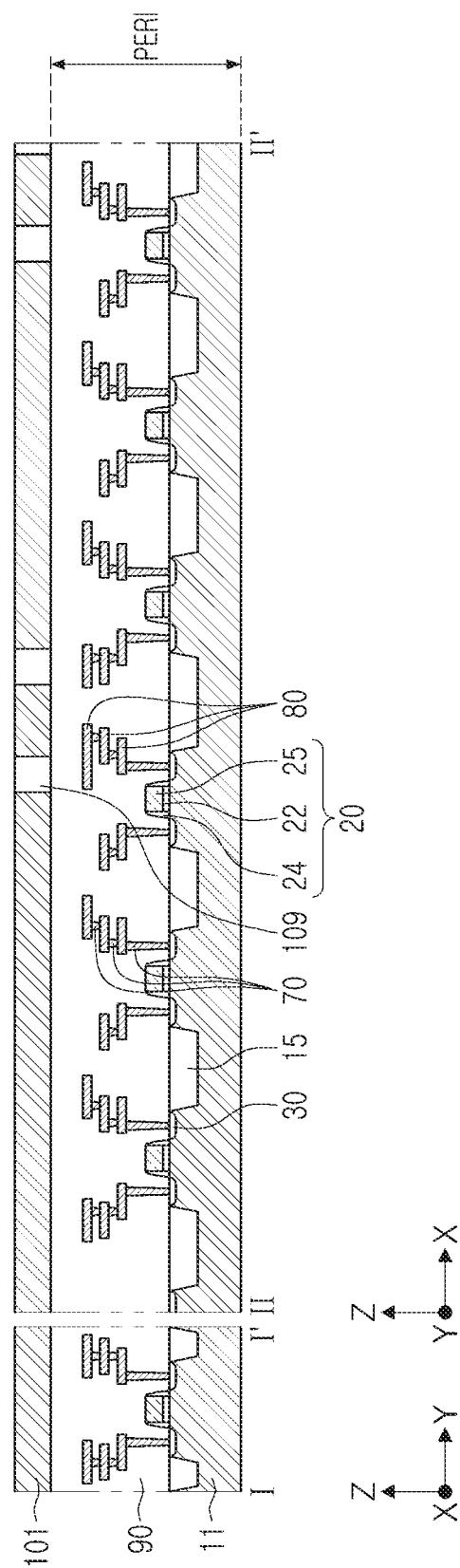
FIGS. 8A to 8F are cross-sectional views illustrating a method of manufacturing a semiconductor device according to some example embodiments.

Referring to FIG. 8A, a peripheral circuit region PERI including circuit elements 20 and circuit interconnection structures may be formed on a first substrate 11, and a second substrate 101 provided with a memory cell region may be formed above a peripheral circuit region PERI.

A circuit gate dielectric layer 22 and a circuit gate electrode 25 may be sequentially formed on the first substrate 11. The circuit gate dielectric layer 22 may be formed of a silicon oxide, and the circuit gate electrode 25 may be formed of at least one of polycrystalline silicon or a metal silicide, but example embodiments are not limited thereto. A spacer layer 24 and source/drain regions 30 may be formed on opposite sidewalls of the circuit gate dielectric layer 22 and the circuit gate electrode 25. According to embodiments, the spacer layer 24 may include a plurality of layers. Then, an ion implantation process may be performed to form source/drain regions 30.

Among the lower interconnection structures, circuit contact plugs 70 may be formed by forming a portion of the peripheral insulating layer 90, etching the portion to be removed, and filling the removing region with a conductive material. The circuit interconnection lines 80 may be formed by depositing, for example, a conductive material and then patterning the conductive material.

The peripheral region insulating layer 90 may include a plurality of insulating layers. The peripheral region insulating layer 90 may be formed to cover the lower circuit elements 20 and the lower interconnection structures finally, by being partially formed in respective operations of forming the lower interconnection structures and being partially formed on the uppermost circuit interconnection line 80.

Next, the second substrate 101 may be formed on the peripheral region insulating layer 90. The second substrate 101 may be formed to have a smaller size the first substrate 11 or to have the same size as the first substrate 11.

In this operation, a substrate insulating layer 109 may be formed to penetrate through the second substrate 101. After the formation of the substrate insulating layer 109, a planarization process, for example, a chemical mechanical polishing (CMP) process may be further performed.

Figure 8B:
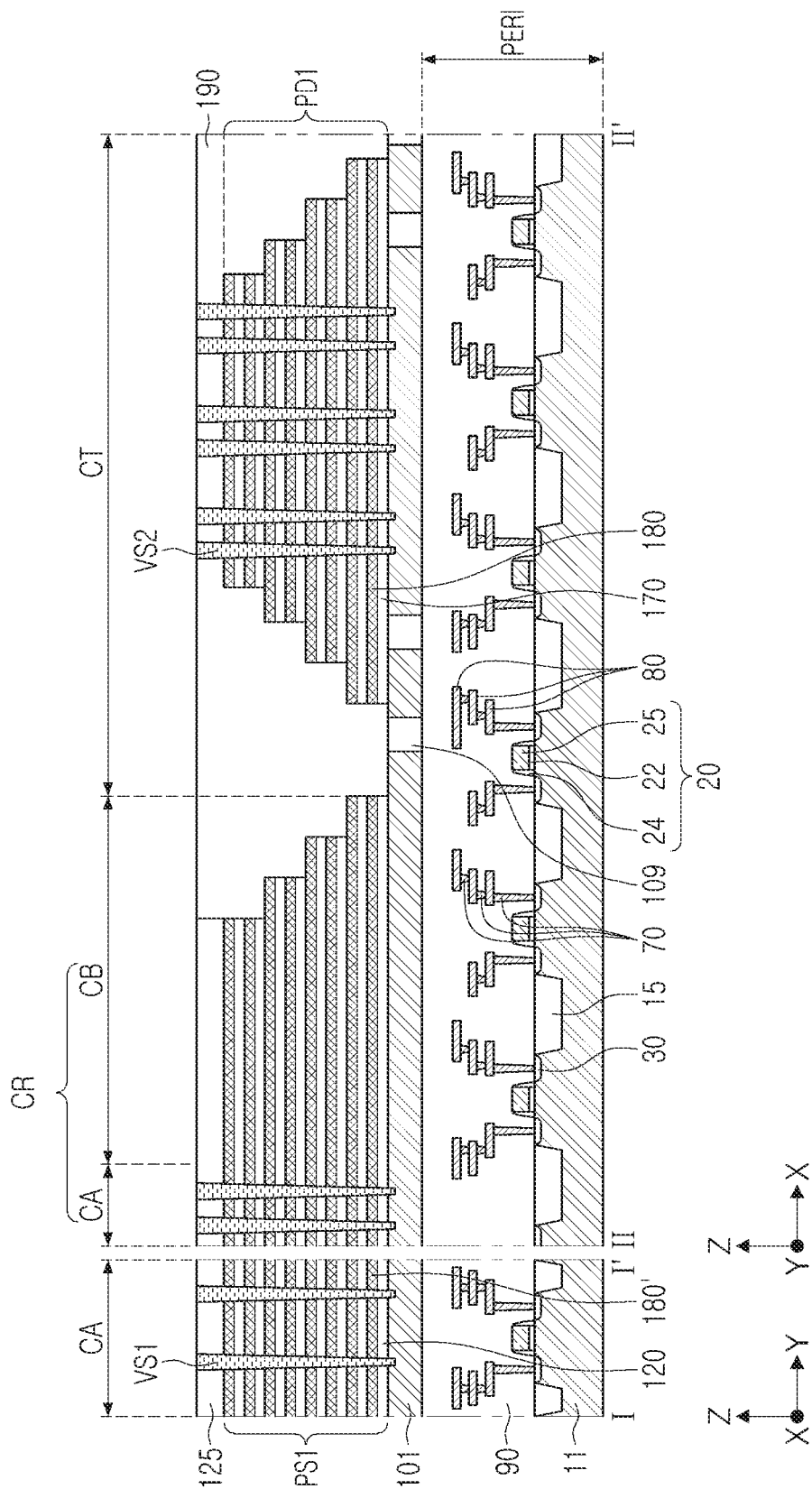

Referring to FIG. 8B, first interlayer insulating layers 120 and first sacrificial insulating layers 180' may be alternately stacked on a cell region CR of the second substrate 101 to form a preliminary stack structure PS1, and first lower insulating layers 170 and second lower insulating layers 180 may be alternately stacked on the peripheral area CT of the second substrate 101 to form a preliminary dummy stack structure PD1, and then vertical sacrificial structures VS1 and VS2 may be formed.

The first sacrificial insulating layers 180' may be a layer having a portion replaced with first gate electrodes 130 (see FIG. 2A) through a subsequent process. The first sacrificial insulating layers 180' may be formed of a material different from a material of the first interlayer insulating layers 120, and may be formed of a material that may be etched with etch selectivity with respect to the first interlayer insulating layers 120 under specific etching conditions. For example, the first interlayer insulating layer 120 may be formed of a silicon oxide, and the first sacrificial insulating layers 180' may be formed of a material which is selected from silicon, silicon oxide, silicon carbide and silicon nitride and which is a material different from that of the first interlayer insulating layers 120. Thicknesses of the first interlayer insulating layers 120 and the first sacrificial insulating layers 180' and the number of configured layers thereof may be variously changed from the illustrated thicknesses. A connection insulating layer 125 may be further formed on uppermost first sacrificial insulating layers 180'. The connection insulating layer 125 may include a material having etch selectivity with respect to the first sacrificial insulating layers 180', for example, the same material as the first interlayer insulating layers 120.

The lower insulating layers 170 may be formed of the same material as the first interlayer insulating layers 120 at a height level corresponding to a height level of the first interlayer insulating layers 120, and the second insulating layers 180 may be formed of the same material as the first sacrificial insulating layers 180' at a height level corresponding to a height level of the first sacrificial insulating layers 180'.

On a cell staircase region CB of the second substrate 101, a photolithography process and an etching process may be repeatedly performed on the first sacrificial insulating layers 180' using a mask layer, such that overlying first sacrificial insulating layers 180' are extended to be shorter than underlying first sacrificial insulating layers 180'. Accordingly, the first sacrificial insulating layers 128 may have a staircase shape and the first interlayer insulating layers 120 may also have a staircase shape.

On the peripheral region CT of the second substrate 101, a photolithography process and an etching process may be repeatedly performed on the second insulating layers 180 using a mask layer, such that overlying second insulating layers 180 is extended to be shorter than underlying second insulating layers 180. Accordingly, the second insulating layers 180 may have a staircase shape, and the first lower insulating layers 170 may also have a staircase shape. The staircase shape of the first sacrificial insulating layers 180' and the staircase shape of the second insulating layers 180 may be formed in the same process operation, but are not limited thereto, and may be formed in different process operations, respectively.

Next, a first capping insulating layer 190 may be formed to cover the first preliminary stack structure PS1 and the first preliminary dummy stack structure PD1.

Next, lower channel holes may be formed to respectively penetrate through the first preliminary stack structure PS1 and the first preliminary dummy stack structure PD1, and then sacrificial layers may be formed in the lower channel holes to respectively form the first and first vertical sacrificial structures VS1 and VS2. The sacrificial layer may include a semiconductor material such as polycrystalline silicon or single crystal silicon, and the semiconductor material may be an undoped material.

In this operation, to manufacture the semiconductor device of FIGS. 3B to 3E, a horizontal insulating layer 110, including first to third horizontal insulating layers 111, 112 and 113, and a second horizontal conductive layer 104 may be formed. The second horizontal insulating layer 112 may be formed of a material having an etch selectivity with respect to the first and third horizontal insulating layers 111 and 113. For example, the first and third horizontal insulating layers 111 and 113 may be formed of a silicon oxide, and the second horizontal insulating layer 112 may be formed of a silicon nitride. The second horizontal conductive layer 104 may be formed of a semiconductor material.

Figure 8C:
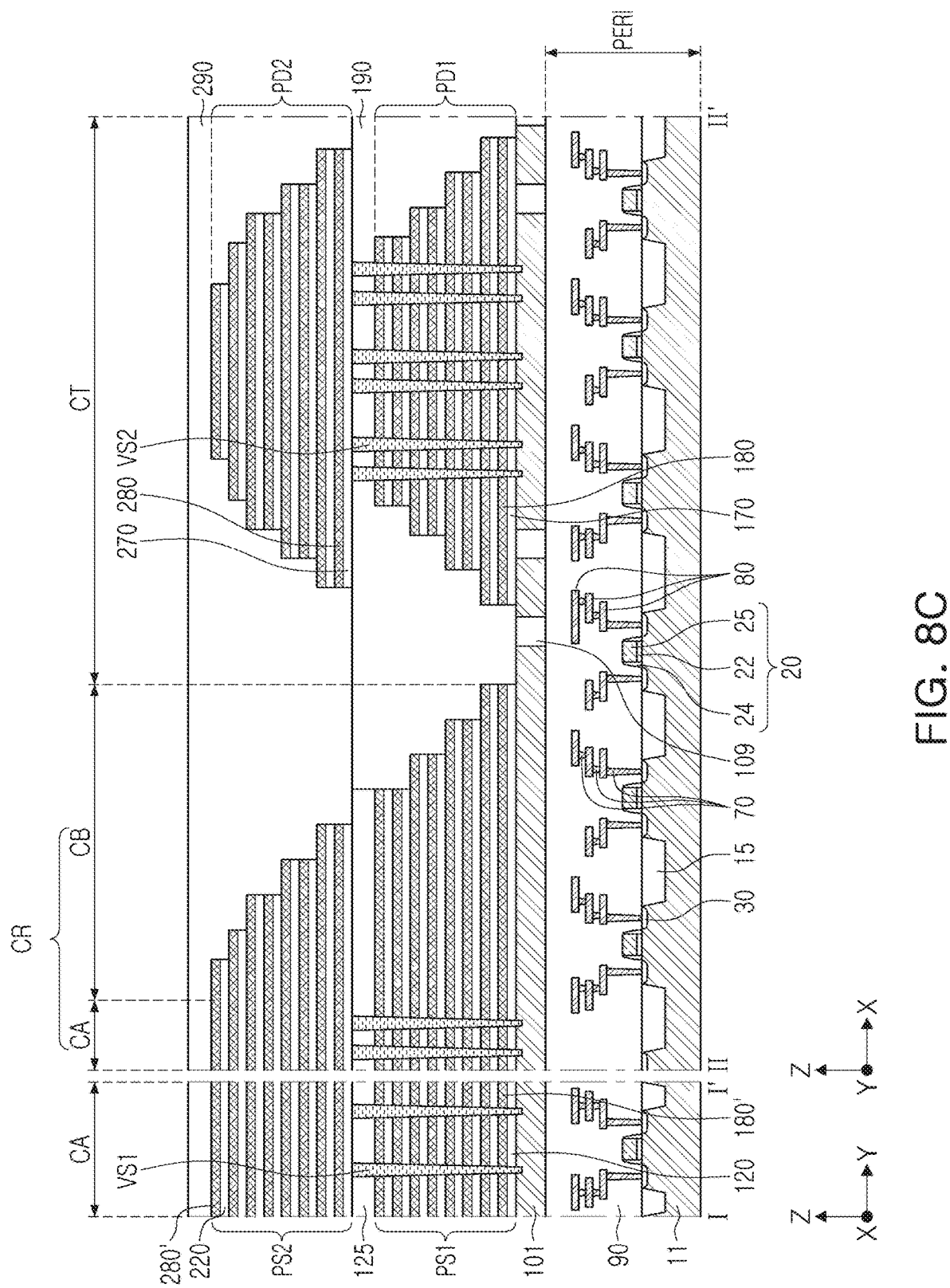

Referring to FIG. 8C, second interlayer insulating layers 220 and second sacrificial insulating layers 280' may be alternately stacked on the first preliminary dummy stack structure PS1 to form a second preliminary stack structure PS2, and first upper insulating layers 270 and second upper insulating layers 280 may be alternately stacked on the first preliminary dummy stack structure PD1 to form a second preliminary dummy stack structure PD2.

The second sacrificial insulating layers 280' may be a layer having a portion replaced with second gate electrodes 230 (see FIG. 2A) through a subsequent process. The second sacrificial insulating layers 280' may be formed of a material different from a material of the second interlayer insulating layers 220, and may be formed of a material which may be etched with etch selectivity with respect to the second interlayer insulating layers 220 under specific etching conditions. For example, the second interlayer insulating layer 220 may be formed of a silicon oxide, and the second sacrificial insulating layers 280' may be formed of a material which is selected from silicon, silicon oxide, silicon carbide and silicon nitride and which is a material different from that of the second interlayer insulating layers 220. Thicknesses of the second interlayer insulating layers 220 and the second sacrificial insulating layers 280' and the number of configured layers thereof may be variously changed from the illustrated thicknesses.

The first upper insulating layers 270 may be formed of the same material as the second interlayer insulating layers 220 at a height level corresponding to a height level of the second interlayer insulating layers 220, and the second upper insulating layers 280 may be formed of the same material as the second sacrificial insulating layers 280' at a height level corresponding to a height level of the second sacrificial insulating layers 280'.

On a cell staircase region CB of the second substrate 101, a photolithography process and an etching process may be repeatedly performed on the second sacrificial insulating layers 280' using a mask layer, such that overlying second sacrificial insulating layers 280' are extended to be shorter than underlying second sacrificial insulating layers 280'. Accordingly, the second sacrificial insulating layers 280' may have a staircase shape and the second interlayer insulating layers 120 may also have a staircase shape.

On the peripheral region CT of the second substrate 101, a photolithography process and an etching process may be repeatedly performed on the second insulating layers 280' using a mask layer, such that overlying second insulating layers 280' is extended to be shorter than underlying second insulating layers 280'. Accordingly, the second insulating layers 280' may have a staircase shape, and the first upper insulating layers 270 may also have a staircase shape. The staircase shape of the second sacrificial insulating layers 280' and the staircase shape of the second insulating layers 280 may be formed in the same process operation, but are not limited thereto, and may be formed in different process operations, respectively.

Next, a second capping insulating layer 290 may be formed to cover the second preliminary stack structure PS2 and the second preliminary dummy stack structure PD2.

Figure 8D:
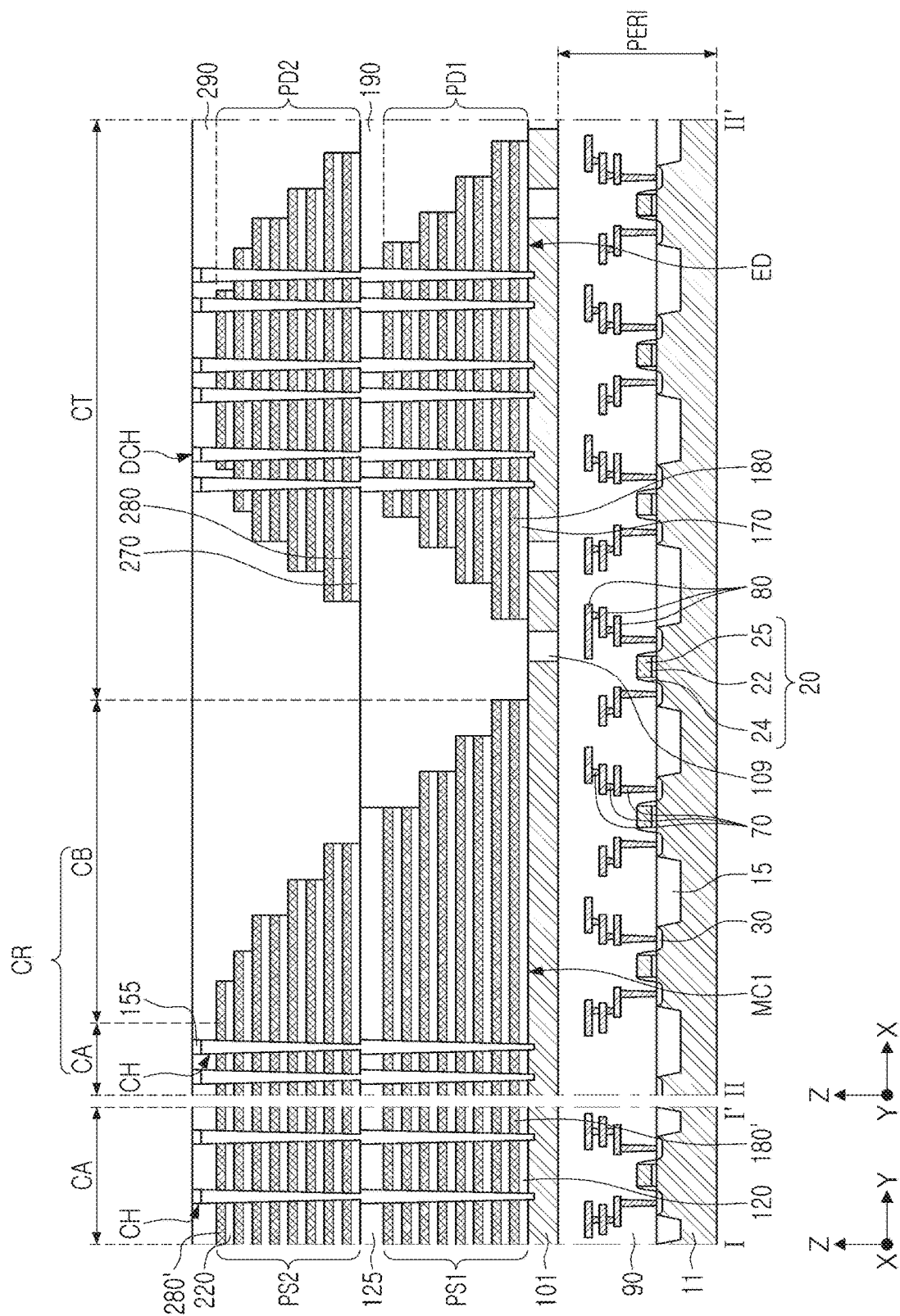

Referring to FIG. 8D, channel structures CH, penetrating through the first and second preliminary stack structures PS1 and PS2, and dummy channel structures DCH, penetrating through the first and second preliminary dummy stack structures PD1 and PD2, may be formed.

The second preliminary stack structure PS2 and the second preliminary dummy stack structure PD2 may be anisotropically etched on the vertical sacrificial structures VS1 and VS2 to form an upper channel hole, and the vertical sacrificial structures VS1 and VS2 exposed through the upper channel hole may be removed. Accordingly, the upper channel hole and a channel hole, to which the upper channel hole is connected, may be formed.

A channel layer 140, a gate dielectric layer 145, a channel insulating layer 250, and channel pads 155 may be formed in the channel holes to form channel structures CH. When the channel structure CH includes an epitaxial layer 105, the epitaxial layer 105 may be formed using a selective epitaxial growth (SEG) process. The epitaxial layer 105 may include a single layer or a plurality of layers. The epitaxial layer 105 may include polycrystalline silicon, single crystal silicon, polycrystalline germanium, or single crystal germanium doped or undoped with impurities. The gate dielectric layer 145 may be formed to have a uniform thickness. The channel layer 140 may be formed on the gate dielectric layer 145 in the channel structures CH. The channel insulating layer 150 may be formed to fill the channel structures CH, and may include an insulating material. The channel pads 155 may be formed of a conductive material, for example, polycrystalline silicon. The dummy channel structure DCH may be formed in the same process operation as the channel structure CH, and may be formed to have the same (or a similar) structure as the channel structure CH.

Figure 8E:
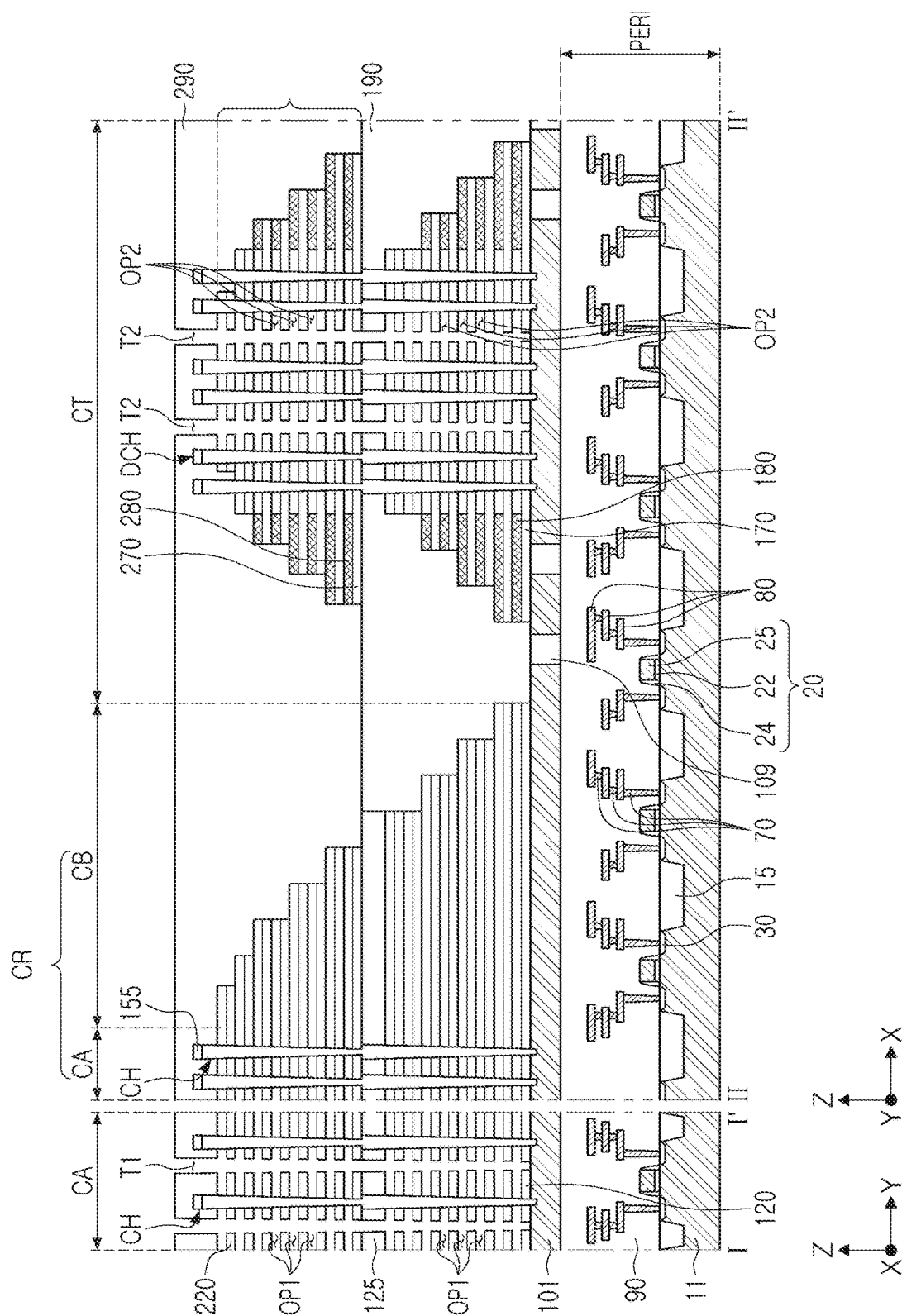

Referring to FIG. 8E, a first separation trench T1, penetrating through the preliminary stack structures PS1 and PS2, and a second separation trench T2, penetrating through the preliminary dummy stack structures PD1 and PD2, may be formed, and portions of the sacrificial insulating layers 180' and 280' and the second lower and second upper insulating layers 180 and 280 may be removed through the first and second isolation trenches T1 and T2.

The first isolation trench T1 may be formed in a region corresponding to the first separation structure MS1 (see FIG. 1), and may be in the form of a trench extending in an X direction. The second separation trench T2 may be formed in a region corresponding to the second separation structure MS2 (see FIG. 1), and may be in the form of a trench extending in a Y direction. The sacrificial insulating layers 180' and 280' and the second lower and second upper insulating layers 180 and 280 may be selectively removed using, for example, isotropic etching, with respect to the interlayer insulating layers 120 and 220 and the first lower and upper insulating layers 170 and 270. Accordingly, a portion of sidewalls of the channel structures CH may be exposed between the interlayer insulating layers 120 and 220, and a portion of sidewalls of dummy channel structures DCH may be exposed between the first lower and first upper insulating layers 170 and 270. The sacrificial insulating layers 180' and 280' and the second lower and second upper insulating layers 180 and 280 may be removed to form horizontal openings OP1 and OP2.

In this operation, before removing the portions of the sacrificial insulating layers 180' and 280' and the second lower and second upper insulating layers 180 and 280, a portion of the horizontal insulating layer 110 and a portion of the gate dielectric layer 145 may be replaced with a first horizontal conductive layer 102 on the cell array region CA through the first separation trench T1. The horizontal insulating layer 110 may remain on the cell staircase region CB and the peripheral region CT. Accordingly, the semiconductor device of FIGS. 3B to 3E may be manufactured.

Figure 8F:
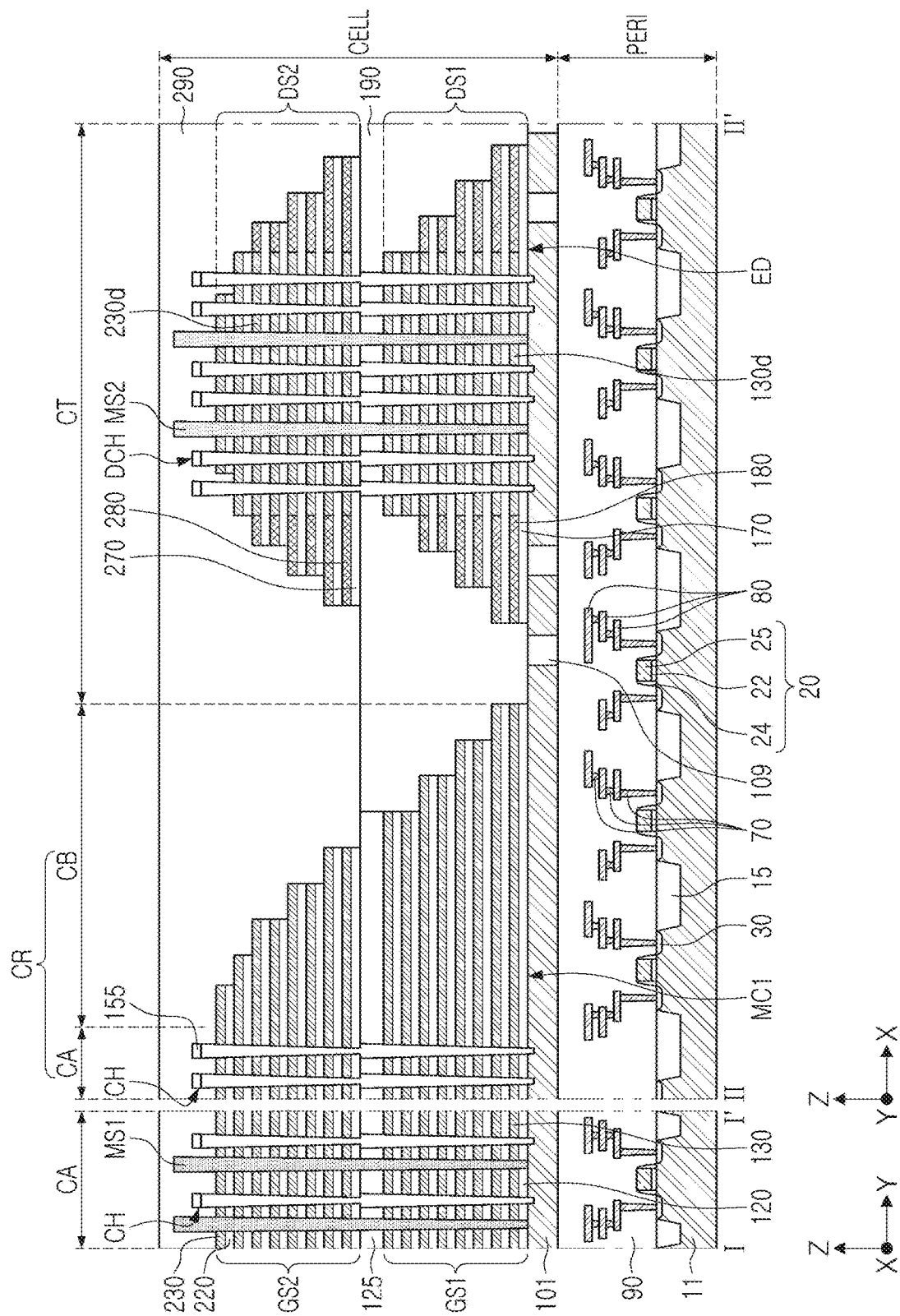

Referring to FIG. 8F, gate electrodes 130 and 230 may be formed in a region in which the sacrificial insulating layers 180' and 280' are removed, dummy gate electrodes 130d and 230d may be formed in a region in which a portion of the second lower and upper insulating layers 180 and 280 is formed, and separation structures MS1 and MS2 may be formed in the separation trenches T1 and T2.

The gate electrodes 130 and 230 may be formed by filling the region, in which the sacrificial insulating layers 180' and 280' are removed, with a conductive material. The gate electrodes 130 and 230 may include a metal, polycrystalline silicon, or a metal silicide material.

Next, the separation structures MS1 and MS2 may be formed by filling the isolation trenches T1 and T2 with an insulating material. Before the formation of the separation structures MS1 and MS2, a process of removing the conductive material formed in the separation trenches T1 and T2 may be further performed.

Next, referring to FIG. 2A, contact holes may be formed to penetrate through capping insulating layers 190 and 290, and a conductive material may be deposited in the contact holes to form contact plugs CNT and upper contact plugs PL, and upper interconnections UP connected thereto may be formed. As a result, a semiconductor device 10A may be manufactured.

Figure 9:
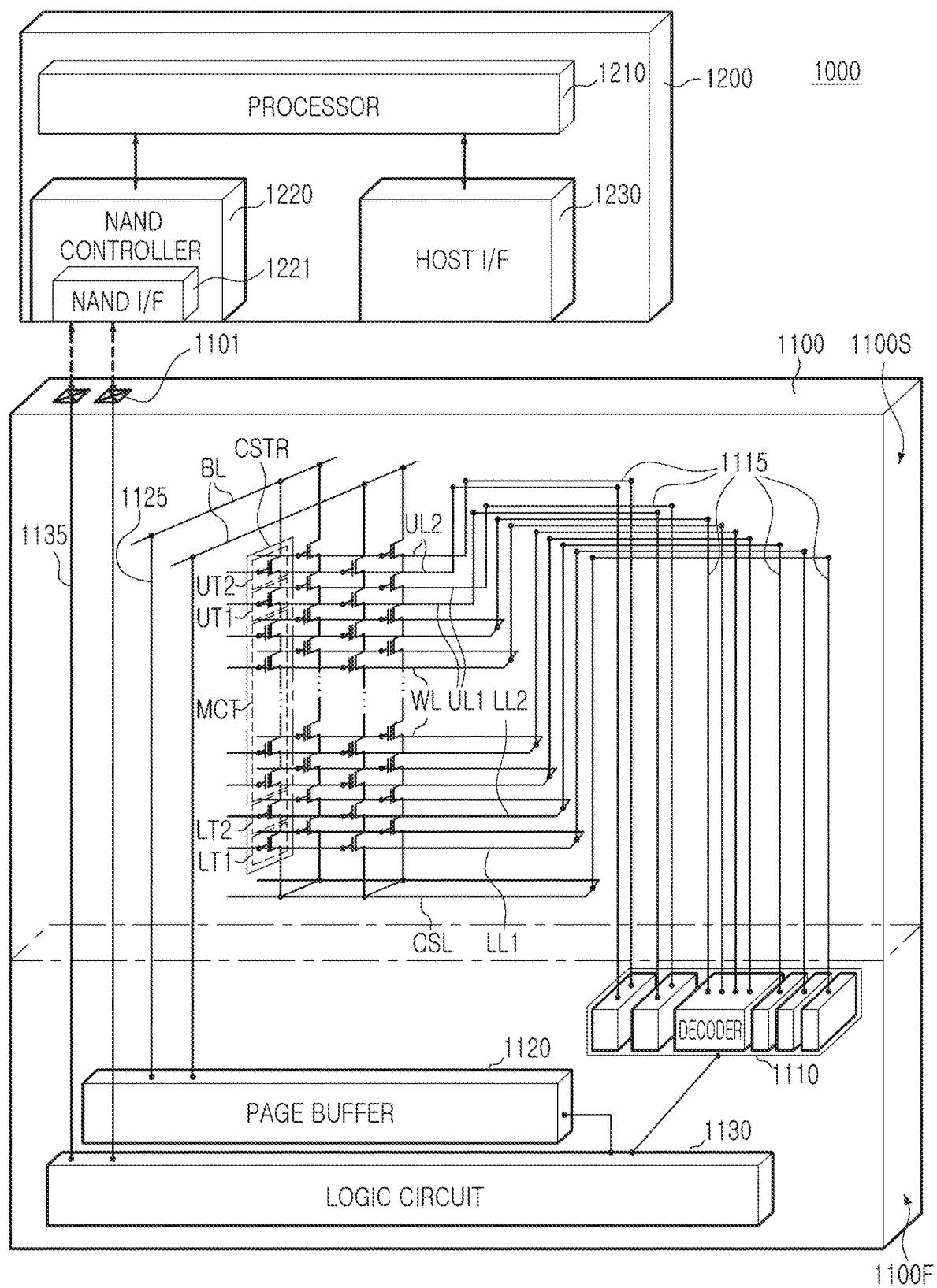
FIG. 9 is a schematic diagram of a data storage system including a semiconductor device according to some example embodiments.

FIG. 9 is a schematic diagram of a data storage system including a semiconductor device according to some example embodiments.

Referring to FIG. 9, a data storage system 1000 may include a semiconductor device 1100 and a controller 1200 electrically connected to the semiconductor device 1100. The data storage system 1000 may be configured as a storage device including one or a plurality of semiconductor devices 1100 or an electronic device including a storage device. For example, the data storage system 1000 may be configured as a solid state drive (SSD) device including one or a plurality of semiconductor devices 1100, a universal serial bus (USB), a computing system, a medical device, or a communications device.

The semiconductor device 1100 may be configured as a nonvolatile memory device, for example, a NAND flash memory device described above with reference to FIGS. 1 to 7. The semiconductor device 1100 may include a first structure 1100F and a second structure 1100S on the first structure 1100F. In some example embodiments, the first structure 1100F may be disposed adjacent to the second structure 1100S. The first structure 1100F may be configured as a peripheral circuit structure including a decoder circuit 1110, a page buffer 1120, and a logic circuit 1130. The second structure 1100S may be configured as a memory cell structure including a bitline BL, a common source line CSL, wordlines WL, first and second gate upper lines UL1 and UL2, first and second gate lower lines LL1 and LL2, and memory cell strings CSTR between the bitline BL and the common source line CSL.

In the second structure 1100S, each of the memory cell strings CSTR may include lower transistors LT1 and LT2 adjacent to the common source line CSL, upper transistors adjacent to the bitline BL, and a plurality of memory cell transistors MCT disposed between the lower transistors LT1 and LT2 and the upper transistors UT1 and UT2. The number of lower transistors LT1 and LT2 and the number of upper transistors UT1 and UT2 may vary in some example embodiments.

In some example embodiments, the upper transistors UT1 and UT2 may include a string select transistor, and the lower transistors LT1 and LT2 may include a ground select transistor. The lower gate lines LL1 and LL2 may be gate electrodes of the lower transistors LT1 and LT2, respectively. The wordlines WL may be gate electrodes of the memory cell transistors MCT, and the upper gate lines UL1 and UL2 may be gate electrodes of the upper transistors UT1 and UT2, respectively.

In some example embodiments, the lower transistors LT1 and LT2 may include a lower erase control transistor LT1 and a ground select transistor LT2 connected in series. The upper transistors UT1 and UT2 may include a string select transistor UT1 and an upper erase control transistor UT2 connected in series. At least one of the lower erase control transistor LT1 and the upper erase control transistor UT1 may be used for an erase operation to erase data stored in the memory cell transistors MCT using the GIDL phenomenon.

The common source line CSL, the first and second gate lower lines LL1 and LL2, the wordlines WL, and the first and second gate upper lines UL1 and UL2 may be electrically connected to the decoder circuit 1110 through first interconnection lines 1115 extending from the first structure 1100F to the second structure 1100S. The bitlines BL may be electrically connected to the page buffer 1120 through second interconnection lines 1125 extending from the first structure 1100F to the second structure 1100S.

In the first structure 1100F, the decoder circuit 1110 and the page buffer 1120 may perform a control operation for at least one selected memory cell transistor, among the plurality of memory cell transistors MCT. The decoder circuit 1110 and the page buffer 1120 may be controlled by the logic circuit 1130. The semiconductor device 1100 may communicate with the controller 1200 through an input/output pad 1101 electrically connected to the logic circuit 1130. The input/output pad 1101 may be electrically connected to the logic circuit 1130 through an input/output interconnection line 1135 extending from the first structure 1100F to the second structure 1100S.

The controller 1200 may include a processor 1210, a NAND controller 1220, and a host interface 1230. According to some example embodiments, the data storage system 1000 may include a plurality of semiconductor devices 1100. In this case, the controller 1200 may control the plurality of semiconductor devices 1100.

The processor 1210 may control overall operation of the data storage system 1000 including the controller 1200. The processor 1210 may operate according to a desired (and/or alternatively predetermined) firmware, and may control the NAND controller 1220 to access the semiconductor device 1100. The NAND controller 1220 may include a NAND interface 1221 for processing communication with the semiconductor device 1100. A control command for controlling the semiconductor device 1100, data to be written in the memory cell transistors MCT of the semiconductor device 1100, data to be read from the memory cell transistors MCT of the semiconductor device 1100, and the like, may be transmitted through the NAND interface 1221. The host interface 1230 may provide a communication function between the data storage system 1000 and an external host. When a control command is received from an external host through the host interface 1230, the processor 1210 may control the semiconductor device 1100 in response to the control command.

Figure 10:
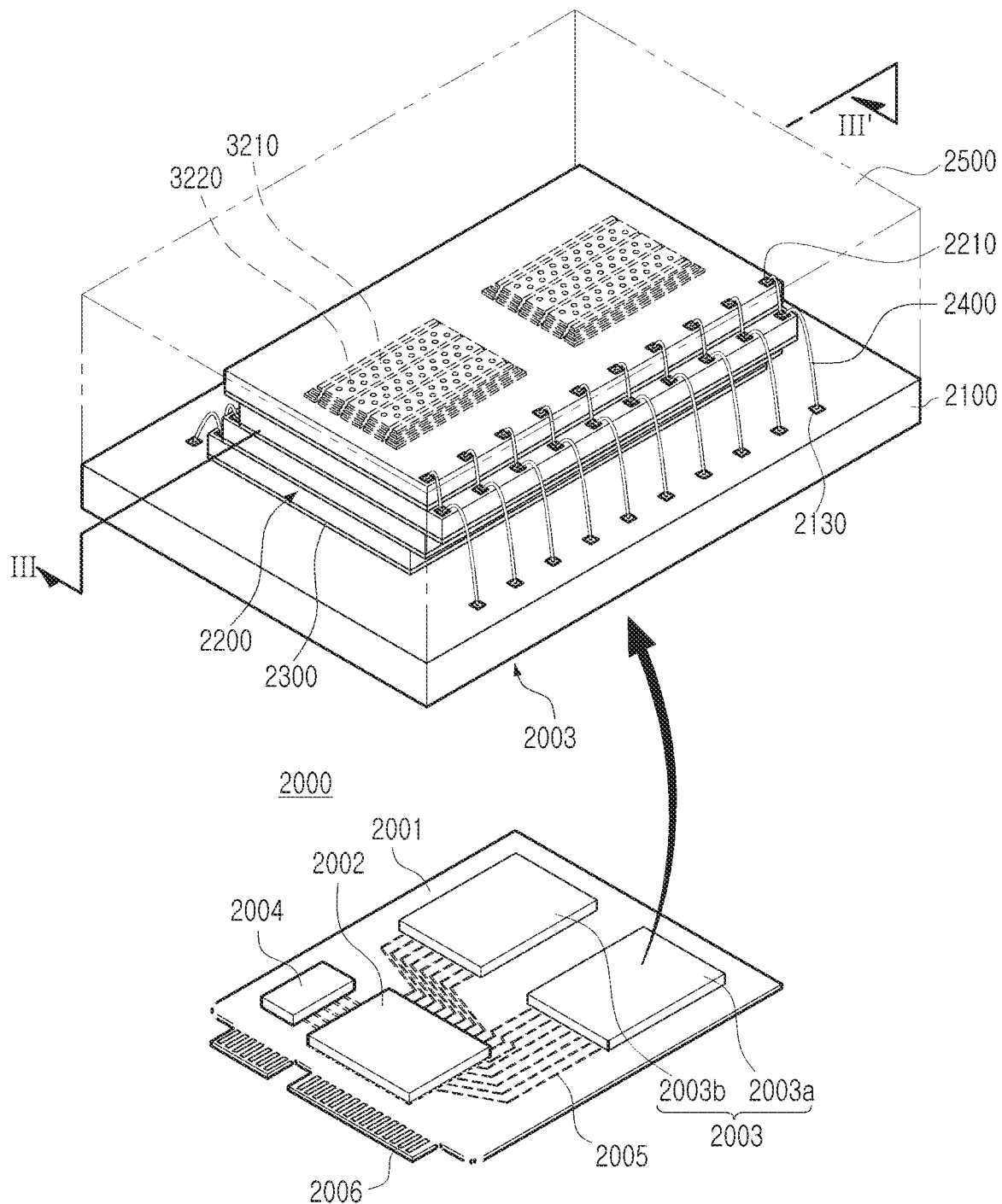
FIG. 10 is a schematic perspective view of a data storage system including a semiconductor device according to some example embodiments.

FIG. 10 is a schematic perspective view of a data storage system including a semiconductor device according to some example embodiments.

Referring to FIG. 10, a data storage system 2000 according to an example embodiment may include a main substrate 2001, a controller 2002 mounted on the main substrate 2001, one or more semiconductor packages 2003, and a DRAM 2004. The semiconductor package 2003 and the DRAM 2004 may be connected to the controller 2002 by interconnection patterns 2005 formed on the main substrate 2001.

The main substrate 2001 may include a connector 2006 including a plurality of pins coupled to an external host. The number and the arrangement of the plurality of pins in the connector 2006 may vary depending on a communications interface between the data storage system 2000 and an external host. In some example embodiments, the data storage system 2000 may communicate with an external host according to one of interfaces such as a universal serial bus (USB), a peripheral component interconnect express (PCI-Express), serial advanced technology attachment (SATA), M-PHY for universal flash storage (UFS), or the like. In some example embodiments, the data storage system 2000 may operate with power supplied from an external host through the connector 2006. The data storage system 2000 may further include a power management integrated circuit (PMIC) distributing power, supplied from an external host, to the controller 2002 and the semiconductor package 2003.

The controller 2002 may write data in the semiconductor package 2003 or may read data from the semiconductor package 2003, and may improve an operation speed of the data storage system 2000.

The DRAM 2004 may be configured as a buffer memory for mitigating a difference in speeds between the semiconductor package 2003, a data storage space, and an external host. The DRAM 2004 included in the data storage system 2000 may also operate as a type of cache memory, and may provide a space for temporarily storing data in a control operation for the semiconductor package 2003. When the DRAM 2004 is included in the data storage system 2000, the controller 2002 may further include a DRAM controller for controlling the DRAM 2004 in addition to the NAND controller for controlling the semiconductor package 2003.

The semiconductor package 2003 may include first and second semiconductor packages 2003a and 2003b spaced apart from each other. Each of the first and second semiconductor packages 2003a and 2003b may be configured as a semiconductor package including a plurality of semiconductor chips 2200. Each of the first and second semiconductor packages 2003a and 2003b may include a package substrate 2100, semiconductor chips 2200 on the package substrate 2100, adhesive layers 2300 disposed on a lower surface of each of the semiconductor chips 2200, a connection structure 2400 electrically connecting the semiconductor chips 2200 to the package substrate 2100, and a molding layer 2500 covering the semiconductor chips 2200 and the connection structure 2400 on the package substrate 2100.

The package substrate 2100 may be configured as a printed circuit board including package upper pads 2130. Each semiconductor chip 2200 may include an input/output pad 2210. The input/output pad 2210 may correspond to the input/output pad 1101 in FIG. 9. Each of the semiconductor chips 2200 may include gate stack structures 3210 and channel structures 3220. Each of the semiconductor chips 2200 may include the semiconductor device described above with reference to FIGS. 1 to 7.

In some example embodiments, the connection structure 2400 may be configured as a bonding wire electrically connecting the input/output pad 2210 to the package upper pads 2130. Accordingly, in each of the first and second semiconductor packages 2003a and 2003b, the semiconductor chips 2200 may be electrically connected to each other by a bonding wire method, and may be electrically connected to the package upper pads 2130 of the package substrate 2100. In some example embodiments, in each of the first and second semiconductor packages 2003a and 2003b, the semiconductor chips 2200 may be electrically connected to each other through a connection structure including a through-silicon via TSV, rather than the bonding wire type connection structure 2400.

In some example embodiments, the controller 2002 and the semiconductor chips 2200 may be included in a single package. In an example embodiment, the controller 2002 and the semiconductor chips 2200 may be mounted on an interposer substrate different from the main substrate 2001, and the controller 2002 and the semiconductor chips may be connected to each other by a wiring formed on the interposer substrate.

Figure 11:
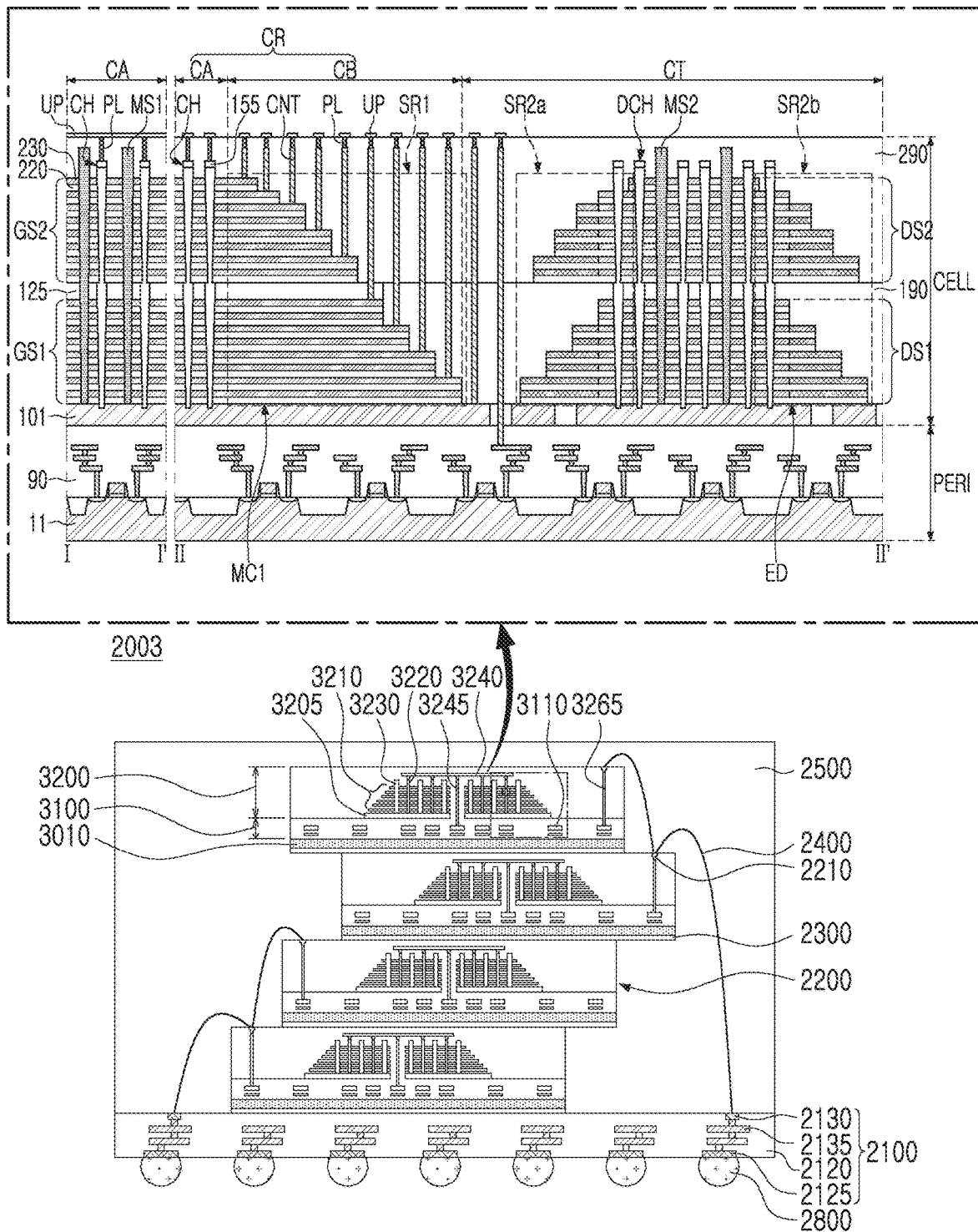
FIG. 11 is a schematic cross-sectional view illustrating semiconductor packages according to some example embodiments.

FIG. 11 is a schematic cross-sectional view of a semiconductor package according to some example embodiments. An example embodiment of the semiconductor package 2003 in FIG. 10 will be described with reference to FIG. 11 which conceptually illustrates a region taken along line III-Ill.

Referring to FIG. 11, in a semiconductor package 2003, a package substrate 2100 may be configured as a printed circuit board. The package substrate 2100 may include a package substrate body portion 2120, package upper pads 2130 (see FIG. 10) disposed on the upper surface of the package substrate body portion 2120, lower pads 2125 disposed on or exposed through a lower surface of the package substrate body portion 2120, and internal wirings 2135 electrically connecting the upper pads 2130 to the lower pads 2125 in the package substrate body portion 2120. The upper pads 2130 may be electrically connected to the connection structures 2400. The lower pads 2125 may be connected to the wiring patterns 2005 of the main substrate 2010 of the data storage system 2000 as illustrated in FIG. 10 through the conductive connection portions 2800.

Each of the semiconductor chips 2200 may include a semiconductor substrate 3010 and a first structure 3100 and a second structure 3200 stacked in order on the semiconductor substrate 3010. The first structure 3100 may include a peripheral circuit region including peripheral wirings 3110. The second structure 3200 may include a common source line 3205, a gate stack structure 3210 on the common source line 3205, channel structures 3220 and isolation regions 3230 penetrating the gate stack structure 3210, bitlines 3240 electrically connected to the memory channel structures 3220, and gate contact plugs 3235 electrically connected to wordlines WL (see FIG. 9) of the gate stack structure 3210. As described above with reference to FIGS. 1 to 2A, each of the semiconductor chips 2200 may include a first separation structure MS1, penetrating through stack structures GS1 and GS2 to extend in an X direction, and a second separation structure MS2 penetrating through dummy stack structures DS1 and DS2 to extend in a Y direction, as illustrated in an enlarged view of FIG. 11. A semiconductor device of each of the semiconductor chips 2200 may include the semiconductor device described above with reference to FIGS. 1 to 7. In a semiconductor package, warpage of a stack structure may be controlled by the first and second separation structures MS1 and MS2.

Each of the semiconductor chips 2200 may include a through-wiring 3245 electrically connected to the peripheral wirings 3110 of the first structure 3100 and extending inwardly of the second structure 3200. The through-wiring 3245 may be disposed on an external side of the gate stack structure 3210, and may be further disposed to penetrate through the gate stack structure 3210. Each of the semiconductor chips 2200 may further include an input/output pad 2210 (see FIG. 10) electrically connected to the peripheral wirings 3110 of the first structure 3100.

As described above, a first separation structure and a second separation structure, respectively extending in directions intersecting each other, may be disposed to control warpage of a stack structure. Thus, a semiconductor device having improved reliability and a data storage system including the same may be provided.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While some example embodiments have been shown and described above, it will be apparent to those of ordinary skill in the art that modifications and variations could be made without departing from the scope of the present inventive concept as defined by the appended claims.

What is claimed is:

1. A semiconductor device comprising:
a peripheral circuit region including a first substrate and circuit elements on the first substrate; and
a memory cell region on the peripheral circuit region, the memory cell region including
a second substrate on the peripheral circuit region,
a memory stack structure including interlayer insulating layers and gate electrodes alternately stacked on the second substrate,
channel structures penetrating through the memory stack structure in a vertical direction and each including a channel layer electrically connected to the second substrate,
first separation structures penetrating through the memory stack structure in the vertical direction,
a dummy stack structure spaced apart from at least one side of the memory stack structure,
dummy channel structures, and
second separation structures,
the first separation structures extending in a first direction and being spaced apart from each other in a second direction,
the dummy stack structure including first insulating layers stacked on each other and spaced apart from each other in the vertical direction on the second substrate, second insulating layers between the first insulating layers, and dummy gate electrodes having side surfaces in contact with side surfaces of the second insulating layers,
the dummy channel structures penetrating through the first insulating layers and the dummy gate electrodes of the dummy stack structure in the vertical direction,
the dummy channel structures each including a dummy channel layer,
the second separation structures penetrating through the first insulating layers and the dummy gate electrodes of the dummy stack structure in the vertical direction,
the second separation structures extending in the second direction and being spaced apart from each other in the first direction, and
the first direction and the second direction being parallel to an upper surface of the first substrate and intersecting each other.

2. The semiconductor device of claim 1, wherein
the gate electrodes are separated by the first separation structures and extend in the first direction, and
the dummy gate electrodes are separated by the second separation structures and extend in the second direction.

3. The semiconductor device of claim 2, wherein
the interlayer insulating layers are separated by the first separation structures and extend in the first direction, and
the first insulating layers are separated by the second separation structures and extend in the second direction.

4. The semiconductor device of claim 1, wherein
the memory stack structure includes a first staircase structure in which the interlayer insulating layers and the gate electrodes form a first staircase shape in the first direction,
the dummy stack structure includes a second staircase structure in which the first insulating layers and the second insulating layers form a second staircase shape in the first direction, and the first staircase structure and the second staircase structure are adjacent to each other and face each other.

5. The semiconductor device of claim 4, wherein the memory cell region further includes contact plugs, respectively extending in the vertical direction, and the contact plugs are connected to the gate electrodes by the first staircase structure.

6. The semiconductor device of claim 4, wherein a shape of the first staircase structure differs from a shape of the second staircase structure.

7. The semiconductor device of claim 4, wherein at least a portion of the dummy gate electrodes define a portion of the second staircase structure.

8. The semiconductor device of claim 1, wherein the memory cell region further includes through-contact plugs, the through-contact plugs penetrate through the second substrate, and the through-contact plugs extend in the vertical direction and are electrically connected to the circuit elements of the peripheral circuit region.

9. The semiconductor device of claim 1, wherein the gate electrodes of the memory stack structure includes a first gate group and a second gate group on the first gate group, and each of the channel structures has a bent portion between the first gate group and the second gate group.

10. The semiconductor device of claim 9, wherein the dummy gate electrodes of the dummy stack structure includes a first dummy gate group and a second dummy gate group on the first dummy gate group, and each of the dummy channel structures has a bent region between the first dummy gate group and the second dummy gate group.

11. The semiconductor device of claim 9, wherein a level of the dummy stack structure is higher than a level of the first gate group.

12. The semiconductor device of claim 1, wherein the gate electrodes include at least one of tungsten (W), titanium (Ti), tantalum (Ta), aluminum (Al), molybdenum (Mo), and ruthenium (Ru).

13. The semiconductor device of claim 1, wherein the second separation structures includes a first separation pattern and a second separation pattern, and a length in the second direction of the first separation pattern differs from a length in the second direction of the second separation pattern.

14. A semiconductor device comprising:
a substrate;
a memory cell structure on the substrate, the memory cell structure including
a memory stack structure including interlayer insulating layers and gate electrodes alternately stacked on the substrate,
channel structures penetrating through the memory stack structure and contacting the substrate, and
first separation structures penetrating through the memory stack structure and extending in a first direction to separate the gate electrodes from each other in a second direction; and
a dummy structure on at least one side of the memory cell structure on the substrate, the dummy structure including
dummy stack structures spaced apart from the memory stack structure on the substrate,
dummy channel structures penetrating through the dummy stack structures, and
second separation structures penetrating through the dummy stack structures,
the dummy stack structures including first insulating layers and dummy gate electrodes alternately stacked, and
the second separation structures extending across an entire length of the dummy structure in the second direction to separate the dummy gate electrodes from each other in the first direction,
wherein each of the second separation structures are spaced apart from each of the first separation structures in the first direction, and
the first separation structures and the second separation structures do not merge in the dummy structure,
wherein the first separation structures are disposed side by side with each other in the second direction, and
the second separation structures are disposed side by side with each other in the first direction, and
wherein the dummy stack structures further include second insulating layers between the first insulating layers, and
side surfaces of the dummy gate electrodes are in contact with side surfaces of the second insulating layers.

15. The semiconductor device of claim 14, wherein the second separation structures penetrate through the dummy gate electrodes and contact the substrate.

16. The semiconductor device of claim 14, wherein
the memory stack structure includes a cell array region including the channel structures, the memory stack structure includes a cell staircase region surrounding the cell array region and in which the gate electrodes have steps in the first direction, and
the dummy stack structures include a staircase region in which the first insulating layers have steps in the first direction.

17. The semiconductor device of claim 16, wherein the cell staircase region and the staircase region face each other in the first direction.

18. A data storage system comprising:
a semiconductor storage device including a peripheral circuit region including circuit elements, a memory cell structure on the peripheral circuit region, a dummy structure on at least one side of the memory cell structure on the peripheral circuit region, and an input/output pad electrically connected to the circuit elements,
the peripheral circuit region including a first substrate,
the circuit elements being on the first substrate,
the memory cell structure including a memory stack structure including a second substrate on the peripheral circuit region, interlayer insulating layers and gate electrodes alternately stacked on the second substrate, channel structures penetrating through the memory stack structure to contact the second substrate, and first separation structures penetrating through the memory stack structure,
the first separation structures extending in a first direction to separate the gate electrodes from each other in a second direction, and
the dummy structure including a dummy stack structure and second separation structures,
the dummy stack structure spaced apart from the memory stack structure on the second substrate,
the dummy stack structure including first insulating layers and dummy gate electrodes alternately stacked, dummy channel structures penetrating through the dummy stack structure, and the second separation structures penetrating through the dummy stack structure, the second separation structures extending across an entire length of the dummy structure in the second direction to separate the dummy gate electrodes from each other in the first direction; and a controller electrically connected to the semiconductor storage device through the input/output pad and configured to control the semiconductor storage device, wherein each of the second separation structures are spaced apart from each of the first separation structures in the first direction, and the first separation structures and the second separation structures do not merge in the dummy structure.

19. The data storage system of claim 18, wherein the memory stack structure includes a first staircase structure in the first direction, and the dummy stack structure includes a second staircase structure in the first direction, and the first staircase structure and the second staircase structure face each other in the first direction, wherein the dummy stack structure further includes second insulating layers between the first insulating layers, and side surfaces of the dummy gate electrodes are in contact with side surfaces of the second insulating layers.

* * * * *